US011245883B2

(12) United States Patent
Sodhi et al.

(10) Patent No.: US 11,245,883 B2
(45) Date of Patent: Feb. 8, 2022

(54) METHOD FOR AUGMENTING SURFACES IN A SPACE WITH VISUAL CONTENT

(71) Applicant: Lightform, Inc., San Francisco, CA (US)

(72) Inventors: Rajinder Sodhi, San Francisco, CA (US); Brett Jones, San Francisco, CA (US); Kevin Karsch, San Francisco, CA (US); Pulkit Budhiraja, San Francisco, CA (US); Phil Reyneri, San Francisco, CA (US); Douglas Rieck, San Francisco, CA (US)

(73) Assignee: Lightform, Inc., San Francisco, CA (US)

( * ) Notice: Subject to any disclaimer, the term of this patent is extended or adjusted under 35 U.S.C. 154(b) by 128 days.

(21) Appl. No.: 16/776,077

(22) Filed: Jan. 29, 2020

(65) Prior Publication Data

US 2020/0374498 A1    Nov. 26, 2020

Related U.S. Application Data

(63) Continuation-in-part of application No. 16/701,018, filed on Dec. 2, 2019, now Pat. No. 10,805,585.
(Continued)

(51) Int. Cl.
*H04N 9/31* (2006.01)
*G03B 21/20* (2006.01)
*G01B 11/25* (2006.01)

(52) U.S. Cl.
CPC ....... *H04N 9/3185* (2013.01); *G01B 11/2518* (2013.01); *G03B 21/2046* (2013.01); *H04N 9/3176* (2013.01)

(58) Field of Classification Search
CPC .. H04N 13/271; H04N 9/3185; H04N 9/3188; H04N 9/317; H04N 9/3122; H04N 9/31; H04N 9/3176; G01B 11/2518; G06T 3/40; G06T 3/00; G06T 3/0018; G06T 3/0043; G06T 7/70; G06T 7/60; G06T 2207/10012; G06T 2207/10016; G06T 2207/10021; G06T 2207/30244; G09G 5/391; G03B 21/2046
(Continued)

(56) References Cited

U.S. PATENT DOCUMENTS 7,394,459 B2 * 7/2008 Bathiche ................. A63F 13/00
345/175
2017/0352192 A1* 12/2017 Petrovskaya ............. G06T 7/77

* cited by examiner

*Primary Examiner* — Sherrie Hsia
(74) *Attorney, Agent, or Firm* — Run8 Patent Group, LLC; Peter Miller

(57) ABSTRACT

One variation of a method for augmenting surfaces in a space includes: at a projection system, recording a sequence of scans of the space; aggregating the sequence of scans into a projector-domain image of the space; detecting a set of objects in the projector-domain image; identifying an object, in the set of objects, as of a first type; detecting a surface proximal the object in the projector-domain image; defining an association between the surface and a content source based on the first type of the object; based on the association, warping visual content output by the content source according to a profile of the surface extracted from the projector-domain image; actuating a projector assembly in the projection system to locate the surface in the field of view of a light projector in the projection system; and projecting the visual content, via the light projector, toward the surface.

20 Claims, 9 Drawing Sheets

Related U.S. Application Data

(60) Provisional application No. 62/800,405, filed on Feb. 1, 2019, provisional application No. 62/834,296, filed on Apr. 15, 2019, provisional application No. 62/780,884, filed on Dec. 17, 2018.

(58) Field of Classification Search
USPC ....... 348/42, 43, 46, 47, 580, 583, 744, 759; 382/154, 276, 293, 296, 297; 345/154, 345/276, 293, 296, 297; 359/443
See application file for complete search history.

METHOD FOR AUGMENTING SURFACES IN A SPACE WITH VISUAL CONTENT

CROSS-REFERENCE TO RELATED APPLICATIONS

This application claims priority to U.S. Provisional Patent Application No. 62/800,405, filed on 1 Feb. 2019, and to U.S. Provisional Patent Application No. 62/834,296, filed on 15 Apr. 219, each of which is incorporated in its entirety by this reference.

This application is a continuation-in-part application of U.S. patent application Ser. No. 16/701,018, filed on 2 Dec. 2019, which claims priority to U.S. Provisional Patent Application No. 62/780,884, filed on 17 Dec. 2018, and to U.S. Provisional Patent Application No. 62/834,296, filed on 15 Apr. 2019, each of which is incorporated in its entirety by this reference.

This application is related to U.S. patent application Ser. No. 16/146,679, filed on 28 Sep. 2018, which is incorporated in its entirety by this reference.

TECHNICAL FIELD

This invention relates generally to the field of light projection and more specifically to a new and useful method for augmenting surfaces in a space with visual content in the field of light projectors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
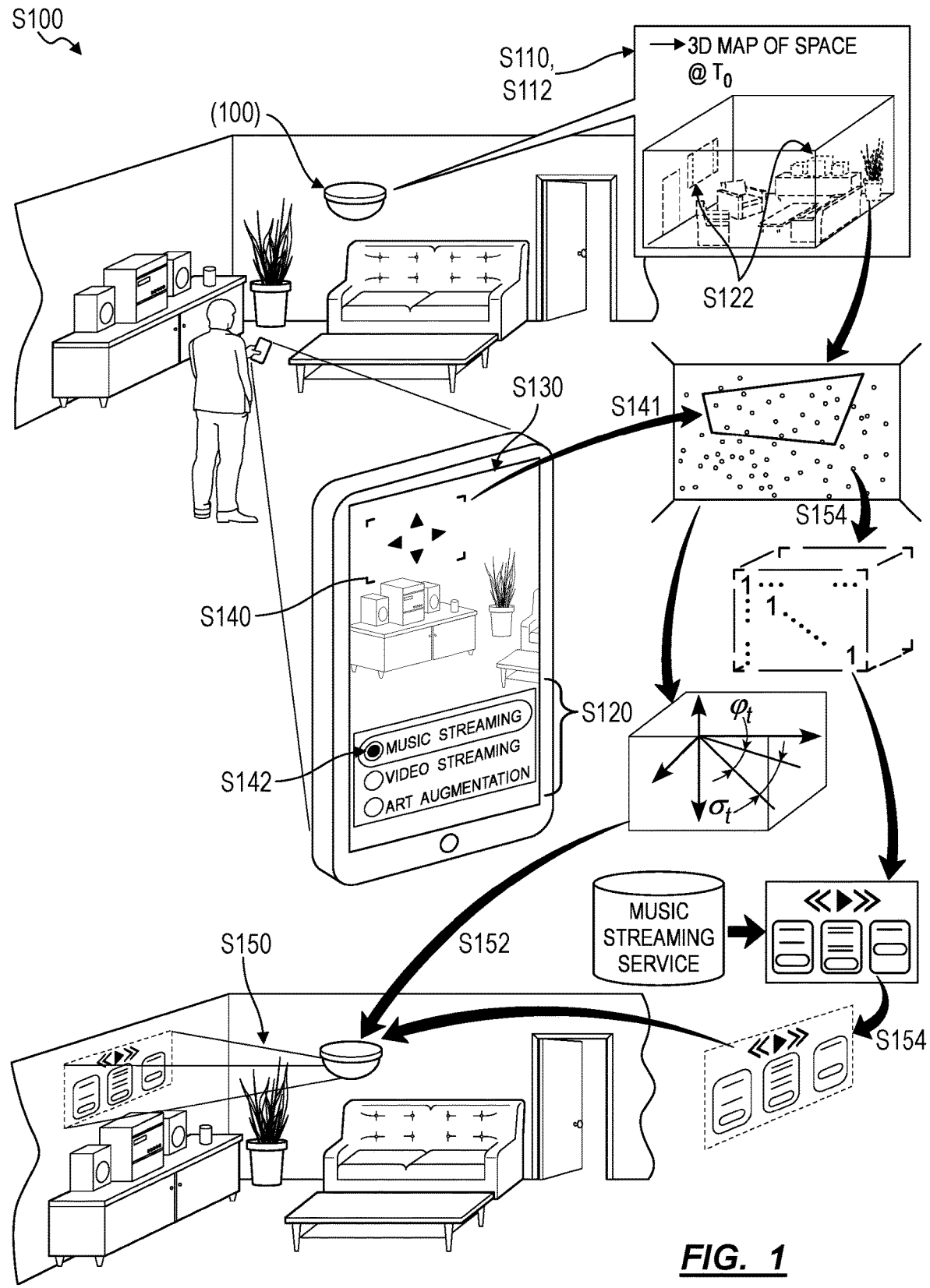
FIG. 1 is a flowchart representations of a method.

As shown in FIG. 1, a method S100 for augmenting surfaces in a space with visual content includes: at a projection system located in the space, recording a sequence of scans of the space in Block Silo; compiling the sequence of scans into a projector-domain image of the space in Block S112; aggregating a set of content sources available to serve visual content to the projection system in Block S120; at a mobile device associated with a user, rendering a video feed, from a camera in the mobile device, on a display of the mobile device at the mobile device in Block S130 and at the display, receiving selection of a particular surface in the space depicted in the video feed rendered on the display in Block S140; linking the particular surface to a particular content source, in the set of content sources in Block S142; and, at the projection system, projecting visual content from the particular content source toward the particular surface based on a profile of the particular surface represented in the projector-domain image of the space in Block S150.

One variation of the method S100 shown in FIG. 1 includes: at a projection system located in the space, recording a first sequence of scans of the space in Block Silo; compiling the first sequence of scans into a first projector-domain image of the space in Block S112; identifying a set of content sources configured to output visual content accessible by the projection system to augment surfaces in the space in Block S120; receiving a first selection from a first device-domain image of the space rendered on a display of a mobile device in Block S140; transferring the first selection into the first projector-domain image to identify a first surface in the space in Block S141; linking the first surface to a first content source in the set of content sources in Block S142; actuating a projector assembly in the projection system to locate the first surface in the field of view of a light projector in the projection system in Block S152; warping a first visual content received from the first content source according to a first profile of the first surface extracted from the first projector-domain image in Block S154; and projecting the first visual content, via the light projector, toward the first surface in Block S150.

Figure 3:
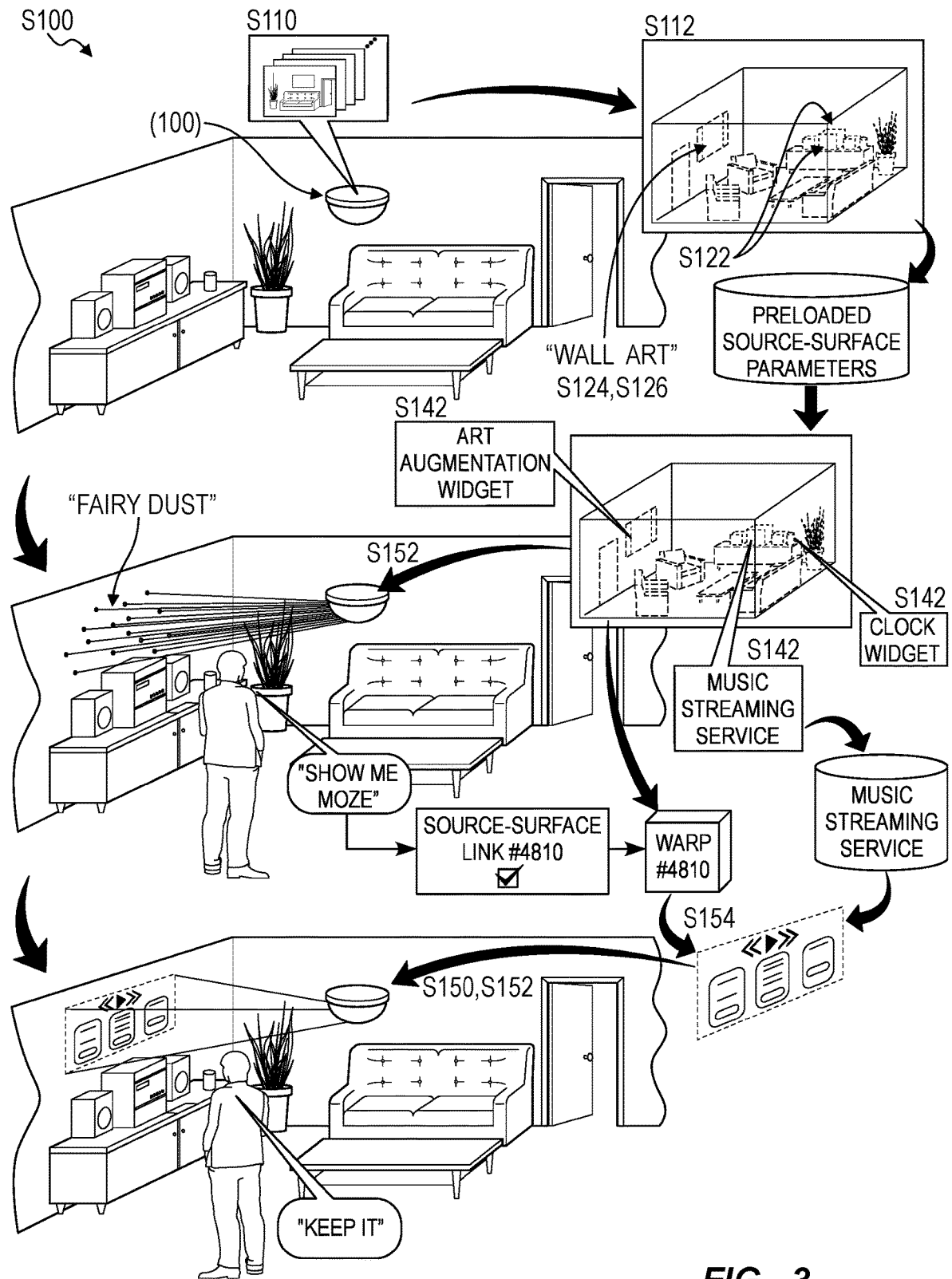
FIG. 3 is a flowchart representations of one variation of the method.
Figure 4:
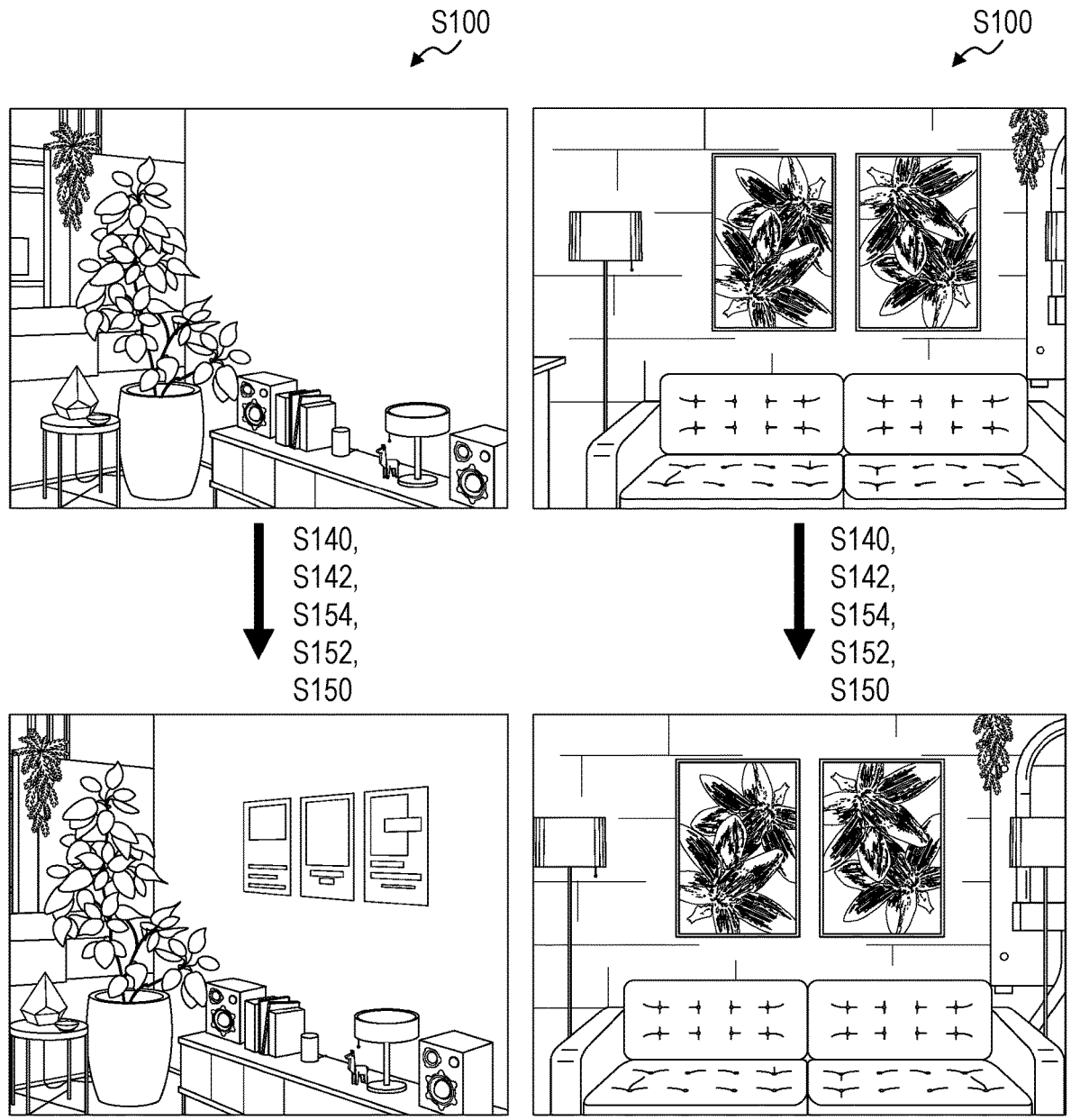
FIGS. 4A and 4B are flowchart representations of variations of the method.
Figure 5:
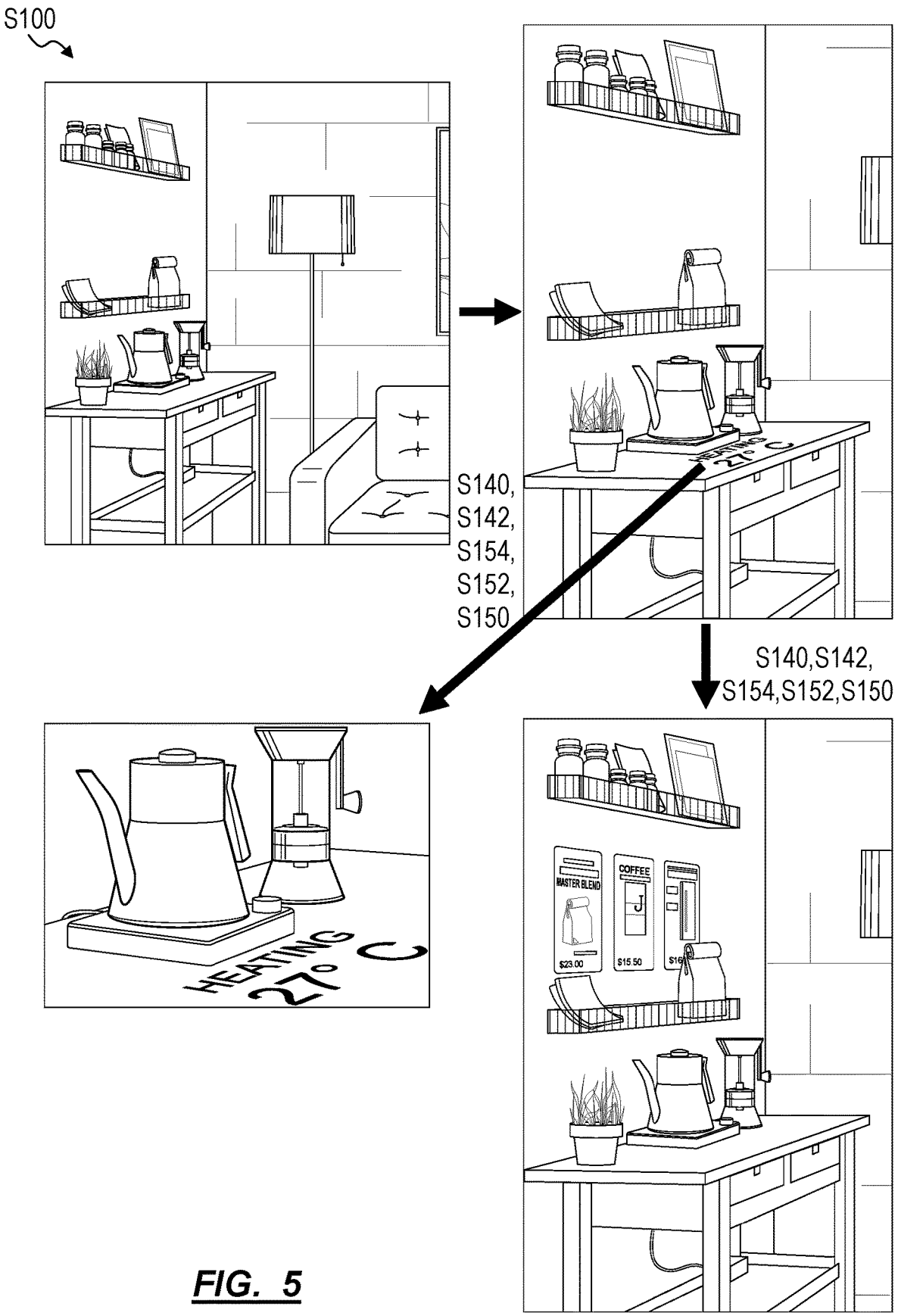
FIG. 5 is a flowchart representation of one variation of the method.

Another variation of the method S100 shown in FIGS. 1 and 3 includes: at a projection system located in the space, recording a first sequence of scans of the space in Block Silo; aggregating the first sequence of scans into a first projector-domain image of the space in Block S112; detecting, in the first projector-domain image, a first surface and a second surface within a threshold distance of the projection system, the second surface distinct and offset from the first surface in Block S122; defining a first association between the first surface and a first content source accessible by the projection system in Block S142; and defining a second association between the second surface and a second content source accessible by the projection system in Block S142. This variation of the method S100 also includes, during a first period of time: based on the first association, warping a first visual content output by the first content source according to a first profile of the first surface extracted from the first projector-domain image in Block S154; actuating a projector assembly in the projection system to locate the first surface in the field of view of a light projector in the projection system in Block S152; and projecting the first visual content, via the light projector, toward the first surface in Block S150. This variation of the method S100 further includes, during a second period of time succeeding the first period of time: based on the second association, warping a second visual content output by the second content source according to a second profile of the surface extracted from the first projector-domain image in Block S154; actuating the projector assembly to locate the second surface in the field of view of the light projector in Block S152; and projecting the second visual content, via the light projector, toward the second surface in Block S150.

Yet another variation of the method S100 shown in FIG. 3 includes: at a projection system located in the space, recording a first sequence of scans of the space in Block Silo; aggregating the first sequence of scans into a first projector-domain image of the space in Block S112; detecting a first set of objects in the first projector-domain image in Block S124; identifying a first object, in the set of objects, as of a first type in Block S126; detecting a first surface proximal the first object in the first projector-domain image in Block S140; defining a first association between the first surface and a first content source based on the first type of the first object in Block S142; based on the first association, warping a first visual content output by the first content source according to a first profile of the first surface extracted from the first projector-domain image in Block S154; actuating a projector assembly in the projection system to locate the first surface in the field of view of a light projector in the projection system in Block S152; and projecting the first visual content, via the light projector, toward the first surface in Block S150.

2. Applications

Generally, Blocks of the method S100 can be executed by a projection system, a mobile device, and/or a remote computer system: to link objects and surfaces in a space to various external content sources (e.g., web services, such as music streaming service or rideshare service; local wireless enabled devices, such as a thermostat or water kettle); and to visually augment the space by casting visual content from these content sources onto corresponding surfaces in the space. In particular, the projection system, the mobile device, and/or the remote computer system can execute Blocks of the method S100 to define spatial associations between various external content sources and certain surfaces in a space.

In one example, during a setup period: the projection system can automatically generate a projector-domain image (e.g., 3D point cloud) of the space and project test content onto surfaces in the space; the mobile device (e.g., a native application executing on the mobile device) can host user controls for verifying, discarding, and moving content sources throughout the space; and the remote computer system can process the projector-domain image of the space to identify surfaces in the space and to predict associations between content sources and these surfaces, which the projection system and/or mobile device can communicate to the user by automatically augmenting these surfaces in real space and/or in augmented reality, respectively. Once surfaces in the space are populated with links to the various content sources, the projection system can: selectively access content from a content source; direct the field of view of an internal light projector assembly toward a surface assigned to this content source; warp, scale, or keystone this content based on a profile of this surface—represented in the projector-domain image of the space previously generated by the projection system—to preserve a geometry of the content when cast onto the surface; and then project this warped content onto the surface. Throughout operation, the projection system can selectively reorient the projector assembly to face different surfaces in the space and to cast content from corresponding content sources onto these surfaces accordingly.

For example, the projection system can be mounted to a ceiling within a space (e.g., a residential living room, a home kitchen, a retail space, an office space). During a setup period, the projection system and the mobile device execute Blocks of the method S100 to define and store associations between: a wall area over a stereo system with a music catalog and album cover art from a music streaming service (shown in FIG. 3A); a wall area opposite a sofa with a video feed and video catalog from a video streaming service; a coaster located on a coffee table with a temperature of a wireless-enabled hot water kettle (shown in FIG. 3C); artwork hung on a wall with an artwork animation referenced to features of the artwork (shown in FIG. 3B); a street map hung on a wall with a planned route and driver status from a rideshare service; a face of a refrigerator located in the space with a grocery catalog and shopping cart from a grocery delivery service; a wall space over a coffee maker with a coffee catalog and shopping cart from the grocery delivery service (shown in FIG. 3C); etc. In this example, the projection system and the mobile device can cooperate to present a gamified augmented reality experience (e.g., an "augmented reality game") for the user to guide the user in identifying available content sources, finding surfaces in her space most relevant to augmentation with visual content from these content sources, and linking these content sources to these surfaces.

During subsequent operation, the projection system can project visual content received from or generated by these content sources onto their associated surfaces in the space and can transition between outputting visual content from these content sources based on voice commands from a user occupying or near the space, based on content priority rules associated with these content sources, or responsive to a change in the space (e.g., a user entering or leaving the space, such as detected by the projection system), as shown in FIGS. 4A, 4B, 5, and 6B.

3. Projection System

Generally, Blocks of the method S100 can be executed by (or on conjunction with) a projection system, such as described in U.S. patent application Ser. No. 16/701,018.

Figure 2A:
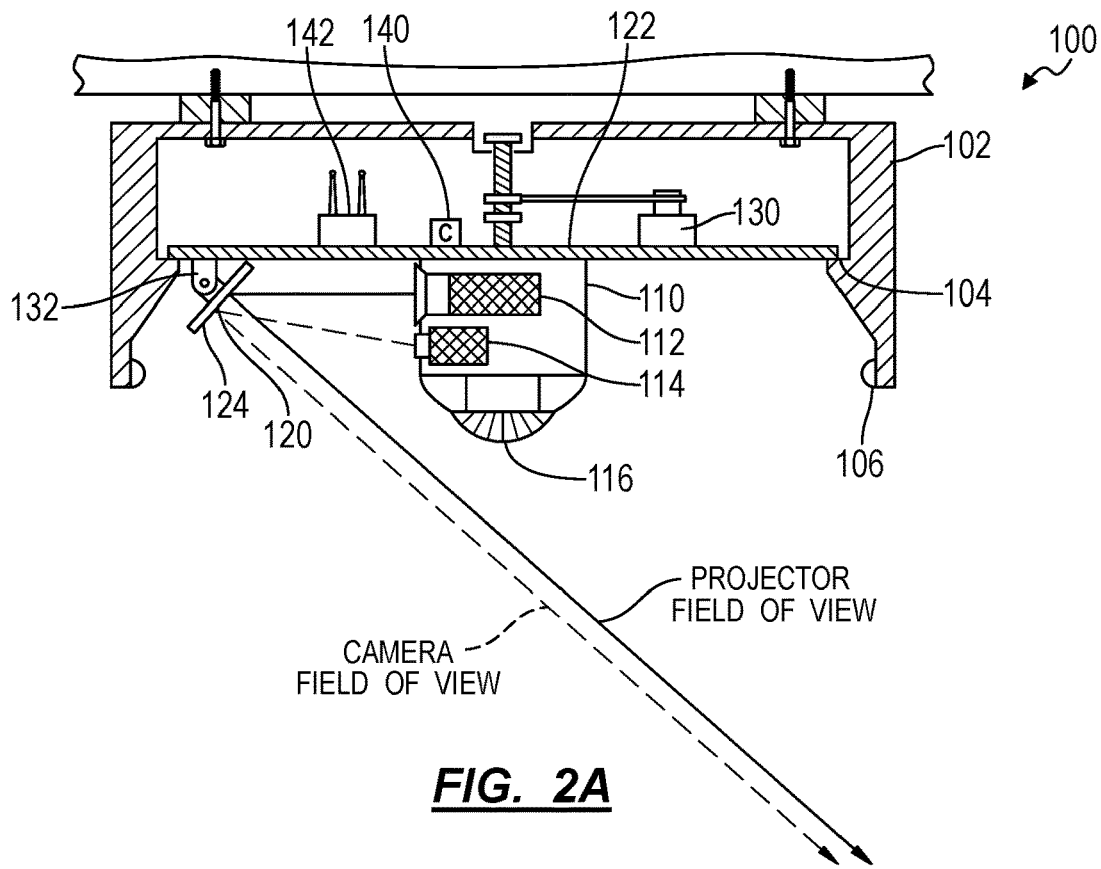
FIGS. 2A and 2B are schematic representations of a system.
Figure 2B:
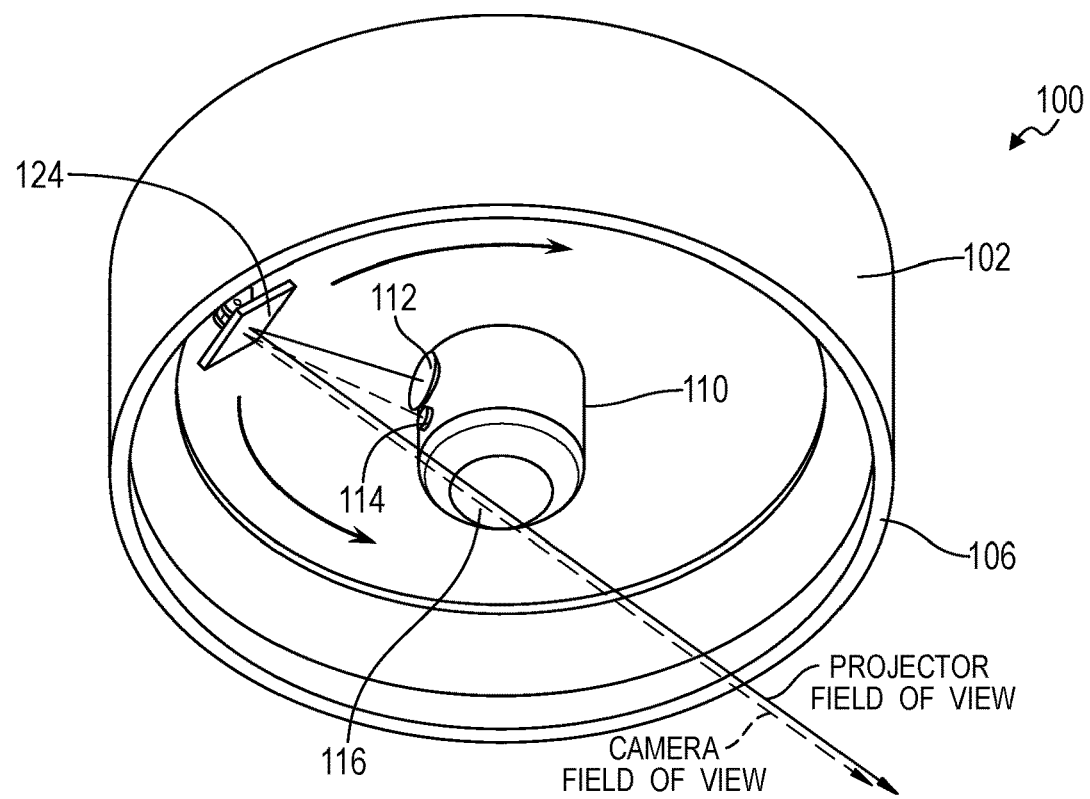

In one implementation shown in FIGS. 2A and 2B, the projection system includes: a housing 102; a projection assembly 110; a projection orientation subsystem 120; an azimuth actuator 130; and a controller 140. The projection assembly 110 is arranged inside the housing 102 and includes: a light projector 112 defining a camera focal axis and defining a projector field of view; and a feedback camera 114 arranged adjacent the light projector 112, defining a camera focal axis offset from and approximately parallel to the projector focal axis, and defining a camera field of view that intersects the projector field of view. The projection orientation subsystem 120 is arranged inside the housing 102 and includes: a reflector support structure 122 coupled to and extending outwardly from the projection assembly no; an outer reflector 124 defining a reflective surface, coupled to a distal end of the reflector support structure 122, and intersecting the projector field of view and the feedback camera 114 field of view; and an altitude actuator 132 coupled to the outer reflector 124 and configured to pivot the outer reflector 124 about a pitch axis of the reflector support structure 122. The azimuth actuator 130 is configured to rotate the projection assembly no and the projection orientation subsystem 120 about an azimuthal axis of the housing 102. The controller 140 is configured to: drive the altitude actuator 132 and the azimuth actuator 130 to a first position to locate the projector field of view and the feedback camera 114 field of view on a first surface within the space; serve a first frame including visual content associated with the first surface to the light projector 112 for projection onto the first surface at a first time; access a first image of the first surface recorded by the feedback camera 114 at approximately the first time; derive a three-dimensional representation of the first surface based on a difference in position of the visual content in the first frame and the visual content detected in the first image; and generate a second frame including the visual content warped to preserve perspective when projected onto the first surface according to the three-dimensional representation of the first surface.

However, the projection system can include any other elements and can function in any other way to scan a field of view of a projector assembly throughout a space and to cast visual content onto surfaces that fall in the field of view of the projector assembly.

3.1 Housing

Generally, the housing 102 is configured to enclose other components of the system 100 and to mount to a surface (e.g., a wall, a ceiling), to sit on a surface (e.g., a table, a floor), or transiently (i.e., temporarily) install on a stand (e.g., a lampstand) within a space. For example, the housing 102 can be configured to mount to a ceiling, such as with drywall anchors, or to install over a ceiling light socket in a vertical "ceiling" configuration. Additionally or alternatively, the housing 102 can be configured to install on a wall—such as in a horizontal "wall" configuration 90° offset from the vertical "ceiling" configuration—in order to cast visual content onto opposing walls, a floor, and a ceiling in the space. Similarly, the housing 102 can be configured for placement on a horizontal surface (e.g., a tabletop)—such as in an inverted "table" configuration 180° offset from the vertical "ceiling" configuration—in order to cast visual content onto nearby walls and the ceiling in the space. In another implementation, the housing 102 includes a receptacle or engagement feature configured to engage a corresponding feature on a stand, such as in the form of a table-lamp stand or a floor-lamp stand; in this implementation, the housing 102 can be installed on a stand in a vertical "stand" configuration.

Furthermore, the housing 102 can include a handle or other lifting feature configured to enable a user to carry the system 100 between different spaces and/or to enable the user to move the system 100 within a space, such as between different mounting configurations described above.

The system 100 can also include a light element 106—such as an LED ring—arranged in the housing 102 configured to illuminate a space occupied by the system 100 when the light projector 112 is inactive. The controller 140 can also dim or disable the light element 106 when the light projector 112 is active in order to dim illumination of the space and thus yield greater contrast between surfaces in the space and visual content projected onto these surfaces.

3.2 Projection Assembly

The projection assembly 110 includes a light projector 112 and a feedback camera 114 paired with the light projector 112.

3.2.1 Light Projector

The light projector 112 is configured to render frames received from the controller 140 and to project these frames—in the form of two-dimensional color projections—toward the outer reflector 124, which then reflects these frames onto an opposing surface. For example, the light projector 112 can include: a DLP (digital light processing) projector or a LCD (liquid crystal display) projector; and a lamp-based or laser-based light source. The light projector 112 can also support color (e.g., RGB or CMYK), grayscale, or black-and-white light projection.

In one variation, the light projector 112 also includes a mechanical zoom controlled by a zoom actuator (e.g., a servo motor) via commands output by the controller 140. However, the system 100 can include a projector of any other type.

3.2.2 Feedback Camera

The feedback camera 114 is mounted adjacent the light projector 112, defines a field of view that intersects the field of view of the light projector 112 (at some distance from the feedback camera 114) and defines a focal axis approximately parallel and offset from the focal axis of the light projector 112 (e.g., the focal axis of the light projector 112 optics and mechanical zoom). For example, the feedback camera 114 can include a color (e.g., RGB) CMOS or CCD camera.

In one variation, the feedback camera 114 also includes an active mechanical zoom, such as similar to and/or controlled by the same zoom actuator as the light projector 112 mechanical zoom. Alternatively, the feedback camera 114 can include fixed optics and can define a field of view that fully contains (and extends minimally beyond) the field of view of the light projector 112 at a lowest mechanical zoom setting of the light projector 112 mechanical zoom. In this implementation, the controller 140 can crop and expand an image recorded by the feedback camera 114 based on the mechanical zoom setting of the light projector 112 at the time the image was recorded in order to scale a scene represented by the image to the concurrent frame projected into the space by the light projector 112 (i.e., to match the field of view of the feedback camera 114 to the concurrent field of view of the light projector 112).

3.3 Projection Orientation Subsystem

The projection orientation subsystem 120 is configured to redirect the fields of view of the light projector 112 and the feedback camera 114 throughout a space occupied by the system 100.

3.3.1 Reflector Support Structure and Outer Reflector

The projection orientation subsystem 120 includes: a reflector support structure 122 coupled to the light projector 112 and feedback camera 114 and extending approximately parallel to and offset from the focal axis of the light projector 12; and an outer reflector 124 located within the fields of view of the light projector 112 and the feedback camera 114 and offset outwardly from the light projector 112 and the feedback camera 114. In one implementation, the reflector support structure 122 includes a beam, such as a carbon fiber or aluminum boom cantilevered outwardly from the light projector 112 and feedback camera 114 assembly; and the outer reflector 124 is coupled to a distal end of the boom.

The outer reflector 124 can include a flat mirror configured: to reflect light output by the light projector 112 toward an opposing surface in the space; and to reflect light from a surface in the space—that intersects light cast onto the surface by the light projector 112—back into the feedback camera 114.

Alternatively, the outer reflector 124 can include a convex mirror configured to expand the fields of view of the light projector 112 and feedback camera 114 over a larger area of a surface in the space, thereby enabling the light projector 112 to cast larger visual content onto a nearer surface in the space and enabling the feedback camera 114 to image this nearer surface. In particular, the outer reflector 124 can include a convex mirror that casts a smaller field of view of the light projector 112 onto a larger area in the space than a flat mirror, thereby: enabling the light projector 112 to define a smaller (in area) field of view, output a smaller image onto the outer reflector 124, and/or include smaller optics; enabling the feedback camera 114 to similarly define a smaller (in area) native field of view but to detect a larger area of the space with smaller optics; and thus enabling a smaller package size for the reflector, the light projector 112, the feedback camera 114, and the housing 102 overall.

3.3.2 Altitude Actuator and Altitude Sensor

The projection orientation subsystem 120 also includes an altitude actuator 132 configured to pivot the outer reflector 124 about a pitch axis of the reflector support structure 122, thereby tilting the fields of view of the light projector 112 and the feedback camera 114 vertically relative to the housing 102. For example, the altitude actuator 132 can include a servo, stepper, or DC gearhead motor.

In one implementation, the altitude actuator 132 is located remotely from the outer reflector 124 and is coupled to the outer reflector 124 with a timing belt or gearbox and driveshaft in order to limit weight cantilevered at the end of the reflector support structure 122. Additionally or alternatively, the housing 102 can define a circular bearing surface 104 concentric with the azimuthal axis of the housing 102. The distal end of the reflector support structure 122 can run along this circular bearing surface 104 as the azimuth actuator 130 described below rotates the projection assembly 110 and the reflector support structure 122 about the azimuth axis of the housing 102; and the circular bearing surface 104 can vertically support the distal end of the reflector support structure 122 against vertical deflection due to gravity and motion of the projection assembly 110.

The projection orientation subsystem 120 can also include an altitude sensor (e.g., a rotary encoder) coupled to the outer reflector 124 and configured to output a signal representing the absolute angular altitude position of the outer reflector 124 relative to a reference position on the reflector support structure 122. Alternatively, the altitude sensor can output a signal corresponding to relative changes in angular altitude position of the outer reflector 124 relative to the reflector support structure 122. The controller 140 can thus implement closed-loop controls to drive the altitude actuator 132 to target angular altitude positions based on outputs to the altitude sensor.

3.4 Azimuth Actuator and Azimuth Sensor

The system 100 also includes an azimuth actuator 130 configured to rotate the projection assembly 110 and the projection orientation subsystem 120—as a unit—about an azimuthal axis (or "yaw" axis) of the housing 102, thereby panning the fields of view of the light projector 112 and the feedback camera 114 horizontally relative to the housing 102. For example, the projection assembly 110 and the projection orientation subsystem 120 can be mounted to a platen supported on a thrust bearing concentric with the azimuthal axis of the housing 102; and a rotary output of the azimuth actuator 130 (e.g., including a servo, stepper, or DC gearhead motor) can be coupled to the platen via a timing belt or gearbox.

The system 100 can also include an azimuth sensor (e.g., a rotary encoder) coupled to the platen and configured to output a signal representing the absolute angular azimuthal position of the projection assembly 110 relative to a reference position on the housing 102. Alternatively, the azimuth sensor can be configured to output a signal corresponding to relative changes in angular azimuthal position of the outer reflector 124 relative to the housing 102. The controller 140 can thus implement closed-loop controls to drive the azimuth actuator 130 to target angular azimuth positions based on outputs to the azimuth sensor.

Therefore, in this implementation, the azimuth actuator 130 can rotate the projection assembly 110 and the projection orientation subsystem 120 as one unit about the azimuthal axis of the housing 102 in order to sweep the fields of view of the light projector 112 and feedback camera 114—reflected toward an opposing surface by the outer reflector 124—horizontally about a space; and the altitude actuator 132 can pivot the outer reflector 124 about the pitch axis of the housing 102 in order to sweep the fields of view of the light projector 112 and feedback camera 114—reflected off of the outer reflector 124—vertically about a space. The controller 140 can thus locate the fields of view of the light projector 112 and the feedback camera 114 throughout a range of azimuthal and altitudinal positions in order to cast content from the light projector 112 onto floor and wall surfaces (and other horizontal, vertical, and three-dimensional surfaces) within the space and to track projection of this visual content into the space via concurrent images recorded by the feedback camera 114.

3.5 Variation: Reflector Support Structure

In one variation shown in FIG. 2A, rather than a beam, the reflector support structure 122 includes a plate or platen, and the light projector 112 and feedback camera 114 are mounted to the platen. In this variation: the platen can define an opening near its perimeter; the outer reflector 124 can be mounted to the platen adjacent (and passing through) the opening; the reflector actuator can be mounted to the platen, such as adjacent the outer reflector 124 or remotely from the outer reflector 124 and coupled to the outer reflector 124 via a timing belt, driveshaft, etc.; and the azimuth actuator 130 can rotate the platen in order to pan the fields of view of the light projector 112 and the feedback camera 114 about the azimuthal axis of the housing 102. Furthermore, in this variation, the perimeter edge of the platen can run along a circular bearing surface 104 defined along an interface face of the housing 102; and this circular bearing surface 104 can thus support the perimeter of the platen in order to preserve alignment between the outer reflector 124 and the projection assembly 10 over a range of operating speeds and angular azimuthal positions of the platen.

3.6 Variation: Context Camera

In one variation, the system 100 further includes a context that: faces downwardly from the housing 102; defines a wide field of view configured to span a large proportion of a space below the housing 102; and records images that enable the controller 140 to detect objects (e.g., people) entering and exiting the space and to generally detect presence of other mutable and immutable objects in the space.

In one example, the context camera 16 includes a color camera with a wide-angle lens and is mounted within the housing 102 such that a focal axis of the context camera 116 is approximately parallel to and aligned with the azimuthal axis of the housing 102. In this example, the context camera 116 can define a wide field of view such that, when the housing 102 is mounted near the center of an eight-foot-tall ceiling in a twelve-foot-square room, the field of view of the context camera 116 includes the full extent of the floor in this room and extends up walls of the room to a maximum height of six feet.

In one implementation, the context camera 116 is fixedly mounted to the housing 102. In this implementation, a coordinate system of the housing 102 can be defined relative to (e.g., aligned with) the image sensor in the context camera 116; and the azimuth sensor can output an absolute angular azimuthal position of the projection assembly 110 relative to this coordinate system defined according to the position of the context camera 116.

In another implementation, the context camera 116 is coupled to the projection assembly 110 and rotates about the azimuthal axis of the housing 102 with the light projector 112 and feedback camera 114. In this implementation, position of the field of view of the context camera 116 may therefore change as the azimuth actuator 130 rotates the projection assembly 110. Accordingly, during operation, the controller 140 can: trigger the context camera 116 to record and timestamp a global image (or otherwise receive a timestamped global image from the context camera 116); record or access an angular azimuthal position of the projection assembly 110—relative to a coordinate system of the housing 102—at the time associated with the global image; and virtually rotate the image by this angular azimuthal position in order to align the global image to the coordinate system of the housing 102 before detecting mutable and immutable objects depicted in this global image.

3.7 Variation: Fixed Projector and Feedback Camera

In one variation, the projection assembly 110 is fixedly arranged in the housing 102. In this variation, the projection assembly 110 can face downwardly approximately parallel and adjacent the azimuth axis of the housing 102, and the system 100 can further include a center reflector. The center reflector: can be coupled to the reflector support structure 122 described above; can be arranged below the light projector 112 and feedback camera 114; can intersect the fields of view of the light projector 112 and feedback camera 14; and can project the fields of view of the light projector 112 and feedback camera 114 toward the outer reflector 124 offset from the azimuthal axis of the housing 102. The outer reflector 124 can then project these fields of view—incident from the center reflector—into the space.

In this variation, the altitude actuator 132 can pivot the outer reflector 124 about the pitch axis of the reflector support structure 122 in order to tilt the fields of view of the light projector 112 and the feedback camera 114 vertically within a space, as described above. Furthermore, the azimuth actuator 130 can rotate the center reflector, the reflector support structure 122, and the outer reflector 124 (and the altitude actuator 132) above the azimuthal axis of the housing 102 in order to pan the fields of view of the light projector 112 and the feedback camera 114 horizontally within the space.

However, in this variation, rotation of the center reflector relative to the light projector 112 may cause the field of view of the light projector 112 to rotate about a ray extending normally from the outer reflector 124 into the field below, therefore rotating content projected onto a surface in the space as a function of angular azimuthal position of the center reflector. Therefore, to counter rotation of content cast into the space by the light projector 112 during a next projection cycle, the controller 140 can: read a current angular azimuthal position of the center reflector—relative to the light projector 112 (e.g., relative to a coordinate system aligned to the light projector 112)—from the azimuthal sensor; calculate an angular offset from this angular azimuthal position to a reference position in which a vector between the center and outer reflectors is parallel to a y-axis of the light projector 12; rotate a next frame in equal and opposite to this angular offset; and then serve this corrected frame to the light projector 112 for projection toward the center reflector, which cooperates with the outer reflector 124 to cast this frame into the space. In this implementation, the controller 140 can similarly rotate an image—recorded concurrently by the feedback camera 114—equal and opposite to this angular offset in order to maintain alignment between the frame output by the light projector 112 and the concurrent image recorded by the feedback camera 114 and depicting projection of this content onto a surface in the space.

3.8 Variation: Biaxial Mirror Articulation

In another variation, the light projector 112 and the feedback camera 114 are fixedly coupled to the housing 102; and the mirror is supported on the housing 102 with the focal axis of the light projector 112 and the feedback camera 114 intersecting the mirror and is configured to rotate in two degrees of freedom (e.g., to pitch and yaw relative to the housing 102). For example, the mirror can be mounted to the housing 102 directly via an altitude actuator 132 and an azimuth actuator 130. The controller 140 can therefore manipulate the altitude actuator 132 and the azimuth actuator 130 in order to move the mirror relative to the light projector 112 and feedback camera 114, thereby scanning the fields of view of the light projector 112 and feedback camera 114 within a conical zone extending horizontal from the housing 102 opposite the mirror.

3.9 Variation: Optically-Aligned Projector and Feedback Camera

In another variation, the feedback camera 114 is optically aligned with the light projector 112 via a 45° half-mirror or other beam-splitter arrangement, thereby substantially eliminating offset between the feedback camera 114 and the light projector 112. In this variation, the controller 140 can implement structure from motion or other photogrammetric range imaging techniques to transform images recorded by the feedback camera 114—while moving the mirror and/or projection assembly 110 relative to the housing 102—to generate a 3D map of the field.

3.10 Variation: Stereo Feedback Camera

In other variation, the feedback camera 114 includes a stereo camera and optics that are large enough to detect and follow a user moving within the field.

3.11 Controller and Supporting Equipment

The system 100 further includes a controller 140 configured to execute methods and techniques described above and below in order: to cast visual content into a space; to monitor visual quality of these content, alignment of these content to other features in the space; to detect context of the space and changes within the space; and to model three-dimensional surfaces within the space based on frames output by the light projector 112 and concurrent images recorded by the feedback camera 114.

The system 100 can also include a power supply, such as configured to connect to a 120 VAC outlet or ceiling light socket and to regulate this power down to 12 VDC. The system 100 can further include a wireless communication module 142 configured to download visual content from external sources, such as a nearby voice-controlled personal assistant, a nearby mobile device (e.g., a smartphone), or a remote computer system.

The system 100 can further include a microphone coupled to the controller 140, and the controller 140 can support voice-enabled interactions. For example, the controller 140 can execute voice-controlled personal assistant functions based on audible signals detected via the microphone, including projecting content orally requested by a user onto corresponding surfaces in the field.

In one implementation in which the context camera 116 is coupled to and rotates with the projection assembly 110, the controller 140, the wireless communication module 142, and the azimuth actuator 130 are also arranged adjacent and rotate with the projection assembly 110 relative to the housing 102. In this implementation, the power supply is arranged in the housing 102 remotely from the controller 140; and a two-channel (e.g., Vcc and ground) power ring—arranged concentrically with the azimuthal axis of the housing 102—communicates power from the power supply to the projection assembly 110. The azimuth actuator 130 can therefore rotate the context camera 116, the projection assembly no, the controller 140, and the wireless communication module 142 continuously about the azimuthal axis of the housing 102.

In another implementation, the controller 140, the wireless communication module 142, and the context camera 116 are fixedly mounted within the housing 102; and the controller 140 and the power supply are coupled to the projection assembly no via a ribbon cable and/or via a power ring. In this implementation, the azimuth actuator 130 can thus rotate the projection assembly no within approximately one azimuthal rotation (e.g., 400°).

However, the system 100 can include these components arranged and integrated in any other way.

4. Receipt and Installation

To install the projection system in a space, a user or technician may: fasten the projection system to a ceiling or overhead beam, as shown in FIG. 1; install the projection system over a ceiling light receptacle; or install the projection system in place of a ceiling fan in a ceiling fan receptacle in the space; etc. In another implementation, the projection system is mounted on (or configured to mount to) a stand to form an "active" floor lamp or an "active" table lamp. In this implementation, the user may place the stand in a space and then install the projection system on the stand.

The user may then download a native application to her mobile device and wirelessly connect her mobile device to the projection system, such as via a local area network or local ad hoc wireless network. The native application can then execute methods and techniques described below to present and guide the user toward linking content sources to various surfaces in the space. (Alternatively, the user may navigate to a web browser on her mobile device, and the mobile device or the remote computer system can execute Blocks of the method S100 through this web browser to present and guide the user toward linking content sources to various surfaces in the space.)

4.1 Projector-Driven Setup

Additionally or alternatively, upon placement in a space, the projection system can automatically scan the space, detect surfaces in the space that are suitable for augmentation, automatically generate links between these surfaces and available content sources (e.g., preloaded content sources, such as a clock widget, an art augmentation widget, and an animated projection system setup manual), and automatically project visual content from these content sources onto their associated surfaces when the projection system is first activated in a space and without further input from the user. The projection system can then receive voice commands from the user to confirm, disable, replace, and shift these source-surface associations. Additionally or alternatively, the projection system can interface with the user via the native application (or web browser) executing on the user's computing device to confirm, disable, replace, and shift these source-surface associations.

4.2 Device-Driven Setup

Additionally or alternatively, the native application (or web browser) executing on the user's mobile device can interface with the user: to scan the space; to generate a 3D representation (hereinafter a "device-domain image") of the space based on data collected during this scan; to enable access to various content sources (e.g., the user's accounts in a music streaming service, a rideshare service, an electronic calendar, a multimedia messaging platform, and a connected home thermostat); to select surfaces represented in the 3D representation of the space; to associate these surfaces with various content sources; and to store these associations in the device-domain image, such as prior to the user receiving the projection system or placing the projection system in the space.

Later, when the user places the projection system in the space, the projection system can execute Blocks of the method S100 to: rescan the space; generate a new 3D representation (hereinafter a "projector-domain image") of the space based on data collected during this new scan; access the device-domain image annotated with source-surface association; to spatially align the projector- and device-domain images; to transfer source-surface association from the device-domain image into the projector domain image; to derive three-dimensional keystone corrections (or "warps") for these content sources based on profiles of associated surfaces extracted from the projector-domain image; to sequentially steer the field of view of the light projector to intersect these surfaces; and to project visual content—published, generated, or otherwise output by these content sources and warped according to their three-dimensional keystone corrections—onto associated surfaces in the space.

5. Content Sources

Block S120 of the method S100 recites identifying a set of content sources configured to output visual content accessible by the projection system to augment surfaces in the space. Generally, during operation, the projection system can source visual content from various external content sources and project visual content streams from these content sources onto corresponding surfaces in the space. In preparation for linking these content sources to surfaces in the space, the native application can aggregate a list of these available content sources in Block S120.

In one implementation, the native application aggregates a list of content sources including other native applications installed on the user's mobile device and/or web services associated with other native applications installed on the user's mobile device, such as: a music streaming service; a video streaming service; a map and geolocation service; an art animation service; a ride share service; an online social network; a text messaging service; a local alarm clock application; an online shopping and fulfillment service; a fitness and exercise service; a calendaring service; a local photo application; a local camera application; a workflow service; and/or a smart-home service; etc. The native application can also aggregate content sources related to workflow and communication tools, such as an electronic calendar, a multimedia messaging platform, or an email platform. Furthermore, the native application can also identify wireless-enabled (or "connected," "IoT") devices in or near the space, such as: a television; a stereo; an internet-connected water kettle; an internet-connected thermostat; or a wireless-enabled light bulb.

In one example, the native application: queries the operating system of the mobile device for a list of other native applications installed on the mobile device; identifies a subset of other native applications—in this list—that support output of visual content or messages to third-parties (e.g., the projection system), such as via APIs; prompts the user to confirm access to data from this subset of native applications; and populates a menu of available content sources with an indicator or icon of each native application thus confirmed by the user. The native application can also port login credentials from these confirmed native applications or corresponding user accounts to the projection system directly or to a user profile associated with the projection system in order to enable the projection system to access visual content from these native applications and/or related web services.

In this example, the native application can also: query the mobile device for a list of connected or stored IoT devices; identify a subset of these IoT devices in this list that support output of visual content or messages to third-parties; prompt the user to confirm access to data from IoT devices in this subset of IoT devices; and add identifiers or icons for each IoT device thus confirmed by the user to the menu of available content sources. The native application can also port data access credentials from these confirmed IoT devices to the projection system directly or to a user profile associated with the projection system in order to enable the projection system to access visual content from these IoT devices and/or from related web services.

However, the native application can implement any other method or technique to aggregate a list of content sources—of any other type or in any other domain—for the projection system in Block S120.

6. Space Setup by Projection System

Figure 6A:
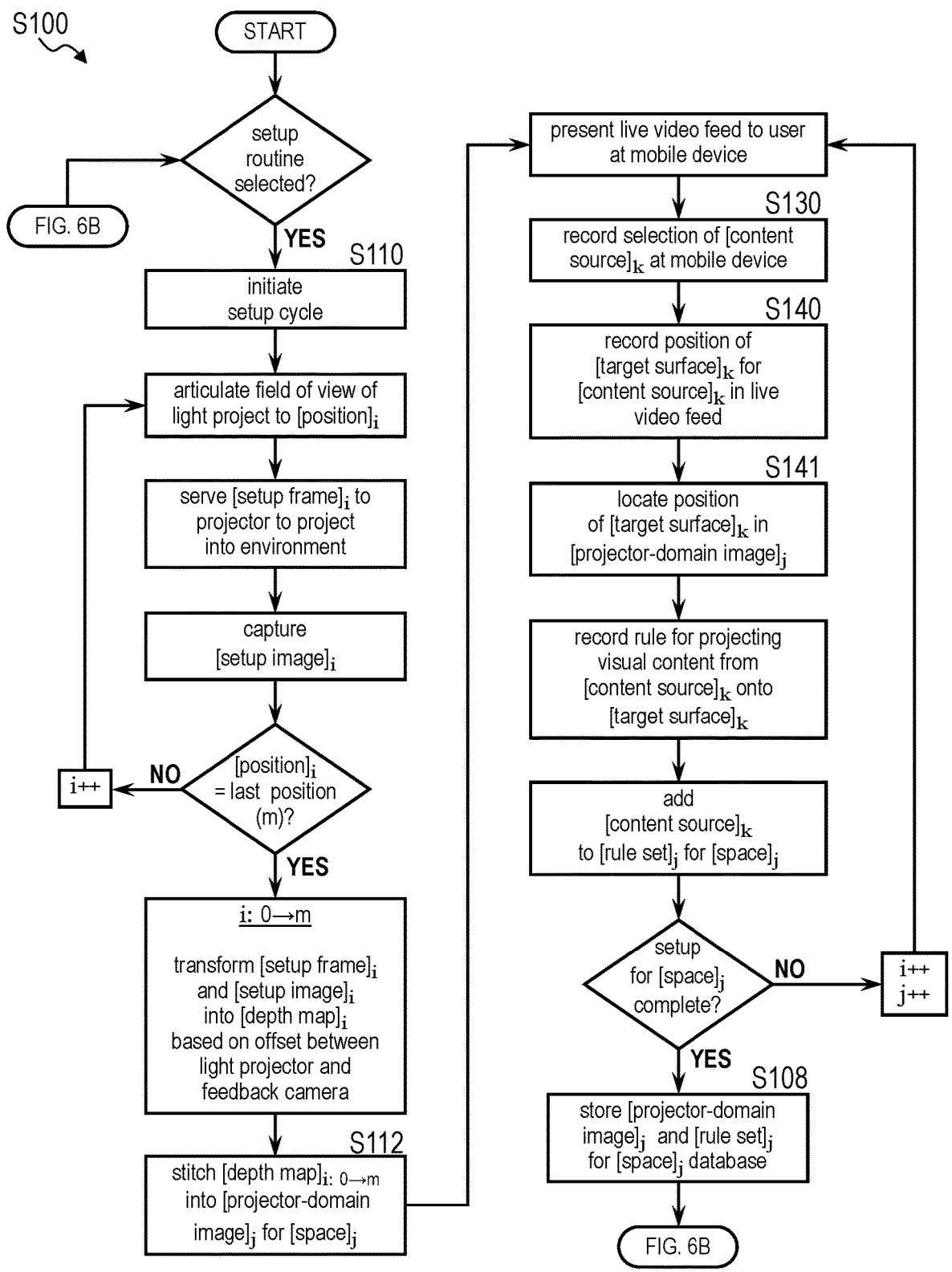
FIGS. 6A and 6B are flowchart representations of one variation of the method.

Block S110 of the method S100 recites, at a projection system located in the space, recording a first sequence of scans of the space; and Block S112 of the method S100 recites compiling the first sequence of scans into a first projector-domain image of the space. Generally, once the projection system is placed or installed in the space and once the native application is installed on the user's mobile device (or once the web application is accessed at the user's mobile device), the projection system can initiate a setup routine to scan the space in Block S110 and to construct a projector-domain image of the space in Block S112, as shown in FIG. 6A.

6.1 Pixel Correspondence Map

In one implementation, during the first setup routine, the projection system: drives altitudinal and azimuthal actuators to locate fields of view of the projector assembly and the feedback camera in a first scan position; and implements auto-focus techniques described below to focus the projector assembly and the feedback camera. The projection system then executes a pixel correspondence routine described in U.S. patent application Ser. No. 16/146,679 to: map a field of view of a pixel in the projector assembly to a field of view of a pixel in the feedback camera for each pixel in the projector assembly; generate a first pixel correspondence map according to the projector assembly-to-camera pixel correspondences; and generate a first disparity map (which may represent distance from the feedback camera to surfaces in the field of view of the feedback camera in this first scan position) for surfaces in the fields of view of the projector assembly in this first scan position. The projection system can then: drive the altitudinal and azimuthal actuators to locate fields of view of the projector assembly and the feedback camera in a second scan position offset from the first scan position; repeat the foregoing process to generate a second pixel correspondence map and a second disparity map for the second scan position; and further repeat this process for each other scan position in a predefined set of scan positions.

For example, the projection system can execute this process to generate one pixel correspondence map and one disparity map for each unique combination of pitch and yaw angles of the outer reflector, including: pitch angles from 0° to 90° in 5° increments; and yaw angles from 0° to 365° in 5° increments. Alternatively, the projection system can implement variable altitudinal and azimuthal increments between scan positions, such as a function of depth to (e.g., proportional to distance to) predominant surface in the field of view of the projector assembly in adjacent scan positions.

The projection system can therefore generate a set of spatially-referenced pixel correspondence maps and disparity maps during a setup routine. The projection system (or a remote computer system or other device) can then compile these disparity maps into one projector-domain image of the space occupied by the projection system. For example, the projection system can stitch disparity maps together based on associated pitch and yaw positions of the outer reflector in order to form a 3D map of surfaces within the space, such as in the form of a triangulated point cloud.

Furthermore, the projection system can identify (and label) a ground plane in the 3D map. For example, the projection system can identify coplanar surfaces spanning the greatest extent of the 3D map as a group plane. In a similar example, the projection system can further include an accelerometer or IMU. The projection system can thus: calculate a direction of gravity relative to the housing based on an output of the accelerometer or IMU; project a vector parallel to gravity into the 3D map; isolate a subset of surfaces in the 3D map that are normal to the gravity vector; identify groups of coplanar surfaces normal to gravity; identify a lowest group of coplanar surfaces normal to gravity as representing a floor surface; and calculate a ground plane that intersects this group of coplanar surfaces.

The projection system can implement similar methods and techniques to detect other vertical or horizontal planar surfaces in the space; later, the native application can prompt the user to augment these planar surfaces with visual content from various external content sources, as described below. For example, the projection system can implement segmentation techniques to automatically detect and distinguish discrete surfaces (e.g., planar surfaces in particular) in the space.

Once the projection system completes this first setup routine and generates a projector-domain image of the space, the projection system can return confirmation of the setup routine to the user's mobile device, which can then prompt the user to return to the space.

Furthermore, the projection system can regularly or intermittently repeat the setup routine in order to update the projector-domain image of the space over time, such as during down periods (e.g., from 3 AM to 4 AM every night, once per week, or once per month) and/or when a human is not detected in the space (e.g., not detected in a global image recorded by the context camera).

6.2 Depth Map

In a similar implementation shown in FIGS. 1 and 6A, the projection system stores: known optical characteristics of both the projector assembly and the feedback camera; known optical pathways from the projector assembly and the feedback camera to the outer reflector; and a known offset between the projector assembly and the feedback camera. Therefore, rather than generate a pixel correspondence map and a disparity map that approximates depth of surfaces in the space, the projection system can instead implement stereoscopy methods and techniques to calculate a first depth map of surfaces within the fields of view of the projector assembly and the feedback camera—when occupying a first scan position—based on these known optical characteristics, optical pathways, and offsets and correspondence between features projected onto these surfaces and positions of like features detected in a concurrent image recorded by the feedback camera. The projection system can then repeat this process for other planned or calculated scan positions and then compile the resulting depth maps into a 3D map of surfaces within the space.

Therefore, during a setup routine, the projection system can: drive the projector assembly through a setup path to sweep the field of view of the light projector across the space; sequentially project—via the light projector—a sequence of setup frames toward surfaces in the space; and sequentially capture a sequence of scans (e.g., depth image, 2D color images, 2D greyscale images) of the space via an optical sensor (e.g., a depth camera, a color camera) adjacent and offset from the light projector and defining a second field of view intersecting the field of view of the light projector. The projection system (or the remote computer system) can then: fuse this sequence of setup frames and this sequence of scans into a set of depth images based on a stored offset between the light projector and the optical sensor; and merge this set of depth images into a projector-domain image—such as in the form of a three-dimensional localization map—of the space.

6.3 Stereoscopy with Feedback and Context Cameras

Additionally or alternatively, the projection system can implement stereoscopy techniques to merge images recorded by the feedback camera with concurrent global images recorded by the content camera to generate a projector-domain image of the space.

For example, the projection system can: drive the altitudinal and azimuthal actuators to locate the field of view of the feedback camera in a first scan position; record a first pair of concurrent images with the feedback camera and the context camera; and isolate an overlapping area of these concurrent images based on known optical characteristics, optical pathways, and relative positions of the feedback camera and the context camera. The projection system can then combine overlapping areas of these concurrent images into a first depth image (e.g., a 3D point cloud) of the space that falls in the fields of view of both the feedback camera and the context camera based on these known optical characteristics, optical pathways, and relative positions of the feedback camera and the context camera. The projection system can then: drive the altitudinal and azimuthal actuators to locate the field of view of the feedback camera in a second scan position; generate a second depth image for the second scan position according to similar methods and techniques; and repeat this process for each other scan position in the predefined set of scan positions. The projection system can then compile these depth images into a spatially-referenced projector-domain image of surfaces in the space.

However, the projection system can execute any other methods or techniques to generate a projector-domain image of the space based on visual content projected into the space and concurrent images recorded by the feedback camera and/or by the context camera during a dedicated setup routine. Furthermore, the projection system can generate this projector-domain image of the space in any other form or format.

6.4 Initial High-Resolution Scan

In one variation, during the first setup routine after placement in the space, the projection system generates a high-resolution projector-domain image of the space, such as in the form of a 3D point cloud characterized by a point density of 10,000 points per square meter of surface area at a distance of three meters from the projection system.

In one example, the native application serves a prompt to the user to exit the space. When the user confirms that she has exited the space, the native application returns a command to the projection system to execute a first setup routine. Additionally or alternatively, the projection system monitors the space for a human or for motion (e.g., in global images captured by the context camera; based on outputs of a motion sensor) and then initiates the first setup routine automatically responsive to detected absence of a human and/or motion in the space.

Then, during this first setup routine, the projection system: articulates the projector assembly through a large quantity of (e.g., one thousand) azimuthal and altitudinal waypoint positions; and projects a setup frame into the space and captures a corresponding setup image at each waypoint position in this large set. Additionally or alternatively, during this first setup routine, the projection system can project multiple setup frames into the space and capture multiple corresponding setup images per waypoint position. The projection system (or the remote computer system) can then: implement stereoscopy methods and techniques to transform each setup frame and image pair captured during this high-resolution setup routine into a depth map; implement image stitching techniques to compile these (many, such as one thousand) depth maps into one high-resolution 3D point cloud containing a large quantity (e.g., millions) of points that represent surfaces surrounding the projection system; and then store this high-resolution 3D point cloud as a high-resolution projector-domain image of the space. The projection system (or the remote computer system) can then manipulate this high-resolution projector-domain image to locate surfaces in the space, to link these surfaces to content sources, and/or to derive profiles of these surfaces for warp and projection-correction calculations, such as described below.

Therefore, the projection system can execute this high-resolution setup routine over a relatively long period of time (e.g., one hour) to capture a large amount of data representative of the space and to transform these data into a high-resolution projector-domain image of the space.

6.5 Initial Low-Resolution Scan

Alternatively, during the first setup routine after placement in the space, the projection system can generate a low-resolution projector-domain image of the space, such as in the form of a 3D point cloud characterized by a point density of 100 points per square meter of surface area at a distance of three meters from the projection system.

In one implementation, when the projection system is first activated following placement in a new space, the projection system executes a low-resolution setup routine to capture low-resolution, baseline spatial information representative of the space over a brief period of time (e.g., one minute). For example, during this low-resolution setup routine, the projection system can: articulate the projector assembly through a small quantity of (e.g., sixty) azimuthal and altitudinal waypoint positions; and project a setup frame into the space and capture a corresponding setup image at each waypoint position in this small set. The projection system (or the remote computer system) can then: implement stereoscopy methods and techniques to transform each setup frame and image pair captured during this high-resolution setup routine into a depth map; implement image stitching techniques to compile these (few, such as one sixty) depth maps into one low-resolution 3D point cloud containing a small quantity (e.g., thousands) of points that represent surfaces surrounding the projection system; and then store this low-resolution 3D point cloud as a low-resolution projector-domain image of the space.

The projection system (or the remote computer system) can then manipulate this low-resolution projector-domain image to estimate surfaces in the space, to define initial associations between these surfaces and content sources, and/or to derive approximate profiles of these surfaces for temporary warp and projection-correction calculations, such as while the user is occupying the space with the projection system. For example, the projection system can execute this low-resolution setup routine over a short period of time while the user installs the native application on her mobile device and/or confirms access to various accounts, other native applications, and/or other web services after placing the projection system in the space. Therefore, within a relatively short period of time, the projection system (or the remote computer system) can generate a low-resolution projector-domain image of the space, which contains sufficient data to approximate surfaces in the space, to link content sources to these surfaces, to approximate three-dimensional keystone corrections for these content sources, and to project visual content from these content sources—deformed according to these approximate three-dimensional keystone corrections—onto their corresponding surfaces in the space, thereby enabling the user to access a custom experience in the space very soon after unpacking the projection system and placing the projection system in the space.

Later, the projection system can execute a high-resolution setup routine to generate a high-resolution projector-domain image of the space, such as: when the projection system detects absence of a human and/or motion in the space; when the user schedules a high-resolution scan of the space; and/or during a scheduled inactive period (e.g., between 2 AM and 5 AM). The projection system can then transfer source-surface associations from the low-resolution projector-domain image into this high-resolution projector-domain image, extract higher-resolution profiles of surfaces—linked to content sources—from the high-resolution projector-domain image, and recalculate higher-accuracy three-dimensional keystone corrections for projection of visual content onto these surfaces based on the higher-resolution surface profiles. The projection system can then apply these higher-accuracy three-dimensional keystone corrections to visual content published or output by their corresponding content sources in order to reduce or eliminate perceived aberrations in visual content projected onto these surfaces by the projection system.

Thus, in this variation, the projection system (and/or the remote computer system) can record a first sequence of low-resolution scans of the space over a first period of time (e.g., during an initial setup period) while a human (e.g., the user) is detected in the space; compile this first sequence of low-resolution scans into a first projector-domain image defining a low-resolution representation of the space; extract a low-resolution three-dimensional profile of a first surface—assigned to a first content source—from this low-resolution projector-domain image; and calculate a first low-resolution warp (e.g., a low-resolution 3D keystone correction) that represents a converse of the low-resolution three-dimensional profile of the first surface. During operation, the projection system (or the remote computer system) can: deform (or warp, transform) visual content output by the first content source according to this first low-resolution warp; and project (or "cast") the deformed visual content from the first content source onto the first surface in the space such that this deformed visual content appears approximately justified and undistorted to the user. Later, when the projection system detects absence of a human or motion in the space, the projection system can: record a second sequence of high-resolution scans of the space over a second period of time greater than first period of time; compile the second sequence of high-resolution scans into a second projector-domain image defining a high-resolution representation of the space; extract a high-resolution three-dimensional profile of the first surface from the second projector-domain image; and calculate a second high-resolution warp that represents a converse of the high-resolution three-dimensional profile of the first surface. Following this second period of time, the projection system can: deform (or warp, transform) visual content output by the first content source according to this second high-resolution warp; and project the first visual content—deformed according to the second warp—toward the first surface such that this deformed visual content appears more completely justified and even less undistorted to the user. Therefore, the projection system can execute this process to: quickly complete an initial setup period in the space and then cast relatively undistorted visual content onto surfaces in the space (e.g., within two minutes of activation in the space); and later refine warps for these surfaces based on higher-resolution spatial data collected when the user is not present in the space.

7. Content Assignment in Device-Domain Image Via Mobile Device

Block S130 of the method S100 recites, at a mobile device associated with a user, rendering a video feed, from a camera in the mobile device, on a display of the mobile device at the mobile device; Block S140 of the method S100 recites, at the display, receiving selection of a particular surface in the space depicted in the video feed rendered on the display; and Block S142 of the method S100 recites linking the particular surface to a particular content source, in the set of content sources.

In one variation, the native application implements augmented reality techniques to scan the space for surfaces or objects, to interface with the user to link available content sources to surfaces or objects detected in the space, and to augment a live video feed—recorded by a camera and rendered on a display of the mobile device (e.g., a "viewfinder")—with virtual representations of content from associated content sources, such as while the projection system separately executes a setup routine to generate a projector-domain image of the space. In particular, in this variation, the native application can implement augmented reality techniques to virtually link available content sources to certain locations in the space; the projection system (or the native application, a remote computer system) can then port spatial links to these content sources from the domain of the mobile device into the domain of the projection system.

7.1 Device-Domain Image

In one implementation shown in FIG. 6A, as the user points her mobile device at various regions of the space, the native application aggregates sensor data (e.g., depth data, color images, orientation, compass heading) from sensors in the mobile device to construct a device-domain image of the space. For example, the native application can guide the user to scan the space and generate a device-domain image of the space prior to linking content sources to surfaces in the space. Alternatively, the native application can construct a device-domain image of the space in real-time as the user interfaces with the mobile device to select surfaces in a live video of the space—rendered on a display of the mobile device—and to link these surfaces to content sources.

For example, while the user points her mobile device toward an area of interest in the space, the native application can: sample sensors in the mobile device (e.g., a camera, a depth sensor, an accelerometer, a gyroscope); construct and/or extend the device-domain image of the space or locate the mobile device within the space based on an existing device-domain image of the space; and render a video feed output by the camera on the mobile device's display in (near) real-time. The native application can also render—on the display—a menu of available content sources.

7.2 Source-Surface Link

The user may then: select a particular content source from the menu of available content sources; and select a point (or "pixel") on the display to locate content from this particular content source. The native application can then: access a content format (e.g., a geometry or generic image) for a particular content source and a default or target projection size for this particular content source; project the point selected by the user into the device-domain image of the space; project the content format of the particular content source onto a 3D surface represented nearest the selected point in the device-domain image (e.g., with the content format of the particular content source approximately centered over the selected point); store this initial position for the content source; and extract a device-domain warp from this 3D surface in the device-domain image.

Similarly, the user may: select a content source from the menu; and draw a boundary over the live video feed rendered on the display. The native application can then implement similar methods and techniques to: project the boundary drawn by the user into the device-domain image of the space; link a region of the device-domain image inside of this projected boundary to the particular content source; extract a surface profile inside the boundary from the device-domain image of the space; calculate a device-domain warp for the particular content source based on this surface profile; deform the content format for the particular content source according to this warp; and overlay this deformed content source over this particular object depicted in the live video feed rendered on the mobile device.

The native application can also augment subsequent frames in the live video feed rendered on the display with an outline (or "border") of the content format for the particular content source in this initial position in order to visually indicate to the user an initial position, geometry, and size of projected content for this particular content source. (The native application can additionally or alternatively retrieve live visual content for this particular content source and overlay this live visual content—at this initial position, size, and geometry—on this live video feed.)

The user may then interface with the mobile device to scale, rotate, or move this content over the live video feed, such as by: dragging the outline of the content format with one finger in order to move the content format laterally or vertically; expanding two fingers over the content format in order to scale the content format; or rotating two fingers of the content format in order to rotate the content format. The native application can then: update the position, geometry, and size of the content format rendered on the display; and update the stored position and device-domain warp for this content source accordingly.

7.3 Object Detection

In one variation, the native application can: implement edge detection or object detection techniques to identify discrete surfaces or objects in the device-domain image of the space (or in a raw video feed recorded by the mobile device); and augment the live video feed—rendered on the display—with borders around these discrete objects or otherwise highlight these detected objects. The user may then select a particular content source from the menu and select a particular object thus highlighted in the video feed. The native application can then: link the particular content source to the particular object accordingly; extract a surface profile of the particular object from the device-domain image of the space; link a region of the device-domain image cospatial with this particular object to the particular content source; calculate a device-domain warp for the particular content source based on this surface profile; deform the content format for the particular content source according to this warp; and overlay this deformed content source over this particular object depicted in the live video feed rendered on the mobile device.

7.4 Live Mobile Augmentation

Over subsequent frames of the video feed recorded by the mobile device, the native application can: track a particular object or surface thus linked to a particular content source by the user; adjust the overlay of content format (or live visual content) for the particular content source in the live video feed based on the surface profile of this object or surface extracted from the device-domain image and based on the position of the mobile device in the space (e.g., relative to this device-domain image); and render this augmented live video feed on the display.

7.5 Source-Surface Adjustment, Confirmation, and Settings

The native application can also shift, rotate, or scale a position or boundary assigned to a particular content source in the space responsive to further inputs from the user, such as described above and shown in FIG. 1. Accordingly, the native application can: shift the position or boundary assigned to a particular content source in the device-domain image; extract a new surface profile from around or inside of this position or boundary; calculate a new warp for the particular content source based on this new surface profile; and update the content format for this particular content source—overlayed in the live video feed—accordingly.

The native application can also prompt the user to confirm this source-surface link. Upon receipt of such confirmation, the native application can: annotate the device-domain image with a point or boundary for augmentation with visual content from the particular content source; and annotate this point or boundary with an identifier or other pointer to the particular content source.

Furthermore, the native application can prompt the user to specify other settings for augmentation of this surface with visual content from this content source, such as: triggers for augmenting this surface (e.g., time of day, movement of a human in the space, location of a human in the space, types of objects present in the space, or activation of associated services or media in the space); and priority for augmenting this surface with visual content from this content source relative to content sources and their corresponding surfaces in the space.

The native application can repeat the foregoing process to link multiple content sources to various objects and/or surfaces in the space and to annotate the device-domain image accordingly, such as over one or many setup periods.

However, in this variation, the native application can interface with the user in any other way to link content from various content sources to particular surfaces or objects in the space and can store links between these content sources and surfaces or objects in any other format.

7.6 Merging Device-Domain and Projector-Domain Images

The native application can then upload this device-domain image of the space—annotated with locations and identifiers of various content sources—to the projection system. The projection system can then align (or "fit") the device-domain image of the space to the projector-domain image of the space, as shown in FIG. 1, such as by: coarsely aligning ground planes and compass directions indicated in these two 3D images of the space; and then aligning closest like planes represented in these two 3D images of the space. The projection system can then transfer augmentation parameters from the device-domain image of the space—now aligned to the coordinate system of the projection system via the projector-domain image—into the projector-domain image in Block S141, such as including: surface boundaries and object assignments for content sources; and orientations and sizes of content cast from content sources onto corresponding surfaces and objects in the space.

Therefore, the native application (and/or the remote computer system) can: receive a selection at a first position over a live video feed captured by the mobile device and rendered on the display of the mobile device as a user manipulates the mobile device within the space; compile frames in this video feed into a device-domain image of the space; locate the first position of the selection—indicated over the video feed—in the device-domain image (e.g., in the form of an augmentation "flag"); and link a first content source to this first position in the device-domain image. The native application can then update the device-domain image to the projection system, which then: spatially aligns the first device-domain image to the first projector-domain image; and transfers the first position of the first selection and an identifier of the first content source from the first device-domain image into the first projector-domain image.

In one variation, the projection system also transfers spatial data (e.g., points, planes) from the device-domain image of the space into the projector-domain image of the space in order to increase the resolution of the projector-domain image of the space.

Alternatively, the projection system can download the projector-domain image of the space to the native application, and the native application can locally implement the foregoing methods and techniques before returning the annotated projector-domain image of the space to the projection system.

Yet alternatively, the native application and the projection system can return their device- and projector-domain images of the space to the remote computer system, which can merge these images to generate an annotated projector-domain image of the space and then return this annotated projector-domain image of the space to the projection system.

7.7 Post-Hoc Setup Routine

In one variation, the native application interfaces with the user to generate and annotate the device-domain image of the space at the user's mobile device prior to placement of the projection system in the space. For example, before purchasing or receiving the projection system, the user may initiate a virtual space augmentation session in the native application to scan multiple rooms in her home, to select surfaces in a device-domain image generated during this virtual space augmentation session, and to confirm links between these surfaces and various content sources.

Later, when the user receives the projection system and places the projection system in a room in her home, the projection system can automatically: execute a (low-resolution) setup routine to generate a projector-domain image; access the annotated device-domain image; and transfer source-surface links from the device-domain image into the projector-domain image, such as described above.

8. Warp Calculation

Block 154 of the method S100 recites warping a first visual content received from the first content source according to a first profile of the first surface extracted from the first projector-domain image. Generally, in Block S154, the projection system calculates a three-dimensional keystone correction, 3D transform, or other "warp" that, when applied to visual content output by a content source, reduces or eliminates distortion of this visual content cast onto a surface assigned to this content source, as shown in FIG. 1.

Figure 6B:
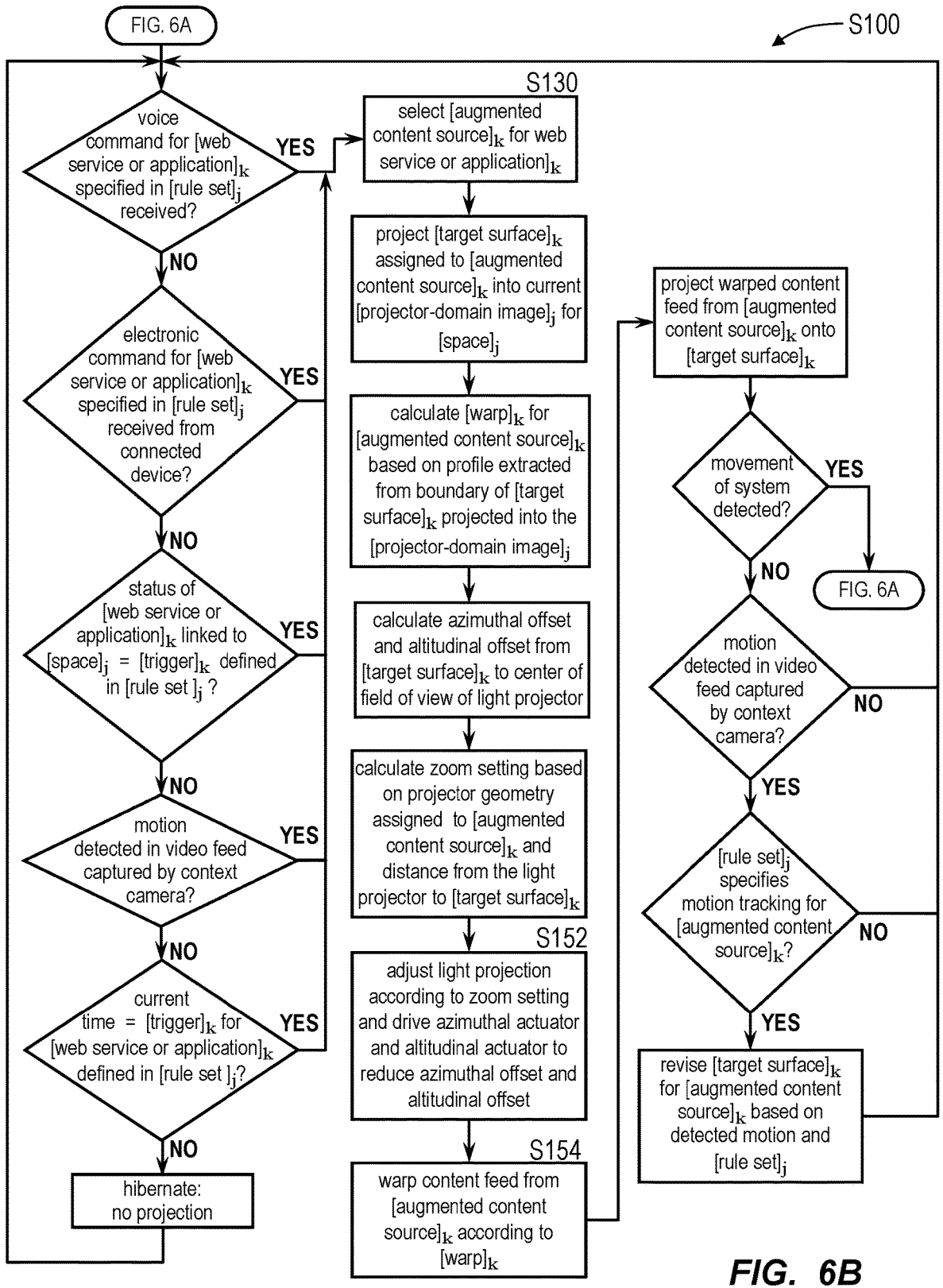

In one implementation shown in FIG. 6B, the projection system calculates a target azimuthal and altitudinal position of the projector assembly that locates a content source flag (e.g., a point, a boundary, or an object assigned to a content source and transferred from the device-domain image into the promotion) in the center of a field of view of the light projector. The projection system then: calculates a volumetric representation of the field of view of the light projector at a nominal zoom setting; projects a focal axis of the light projector—extending along the target azimuthal and altitudinal position—into the projector-domain image; and then locates the volumetric representation of the field of view of the light projector—extending along the focal axis—in the projector-domain image. The projection system then: calculates an intersection of the volumetric representation of the field of view of the light projector and surfaces represented in the projector-domain image; extracts dimensions of this intersection (e.g., height, width, planarity); and adjusts the zoom setting of the light projector based on a difference between these dimensions and projection settings assigned to this content source. For example, the projection system can increase the zoom setting of the light projector if both width and height dimensions of the intersection are greater than width and height settings assigned to this content source; and vice versa.

The projection system can then: repeat this process to recalculate an intersection of the volumetric representation of the field of view of the light projector—at this adjusted zoom setting—and surfaces represented in the projector-domain image; define a virtual projection boundary on a surface in the projector-domain image along the edge of this intersection; and extract a profile of a surface—inside this virtual projection boundary—represented in the projector-domain image, such as in the form of a constellation of points contained inside a virtual projection boundary and referenced to an origin of the projection system. The projection system can then: calculate a plane normal to a focal axis of the light projector and located at an intersection of the focal axis and represented in the projector-domain image; calculate a transform that maps the constellation of points onto the plane; and then store the inverse of this transform as a warp associated with projection of visual content from this content source onto this surface in the space.

In this implementation, the projection system can also verify characteristics of surfaces intersecting the volumetric representation of the field of view of the light projector in the projector-domain image. For example, the projection system can scan the constellation of points in the projector-domain image for a group of points nearest the flag and that represent a contiguous surface approximating a vertical plane, are unobstructed in the field of view of the light projector, and span an area approximating a target projected width and height of visual content from the assigned content source. In this example, the projection system can shift the flag for this content source to (or toward) the center of this nearest group of points and define a virtual projection boundary around this group of points before completing the process described above. In another example in which the flag specifies projection onto an object, the projection system can: scan the constellation of points in the projector-domain image for a group of points nearest the flag and that approximate a discrete surface offset from other nearby surfaces (e.g., a second group of points that represent a wall behind the object); and define a virtual projection boundary around this group of points before completing the process described above.

Therefore, the projection system can extract a three-dimensional profile of a surface represented in the projector-domain image; calculating a warp (e.g., a three-dimensional keystone correction) that represents a converse of this three-dimensional profile of this surface; and later deform visual content—output by the content source associated with this surface—according to the warp before projecting this deformed visual content onto this real surface in the space.

9. Projection

Blocks S152 and S150 of the method S100 recite: actuating a projector assembly in the projection system to locate the first surface in the field of view of a light projector in the projection system; and projecting the first visual content, via the light projector, toward the first surface. Generally, when projecting visual content onto a target surface in the space (e.g., a temperature of a tea kettle projected onto a coaster on a table; a map of a rideshare route projected onto a street map hung on a wall; a virtual game board projected onto a coffee table; an art animation projected onto wall art or a freestanding sculpture), the projection system can: drive the altitudinal and azimuthal actuators to target altitudinal and azimuthal positions assigned to this content source for this space in Block S152; drive a zoom actuator in the light projector to a zoom setting assigned to this content source for this space; access visual content (e.g., a static frame or a content feed) from the content source; apply the warp—calculated for this content source and the corresponding surface in this space—to the original visual content in Block S154; and then project the warped static frame or warped content feed onto the target surface in Block S150, as shown in FIGS. 1 and 6B. The warped visual content thus projected onto the target surface by the projection system may therefore be perceived by a user as undistorted, as shown FIGS. 4A, 4B, 5, 7, and 8.

In particular, in Block S152, the projection system can drive azimuthal and altitudinal actuators in the projection assembly to pan and tilt the light projector to target azimuthal and altitudinal positions calculated for the content source and the corresponding surface in the space, as described above. The projection system can also: adjust a zoom of the light projector according to the zoom setting assigned to this content source and the corresponding target surface; and scale the visual content to fill the field of view of the light projector. The projection system can then apply the warp—associated with the content source and this target surface in this space—to the visual content and serve this warped visual content to the light projector for projection onto the corresponding surface, such as described in U.S. patent application Ser. No. 16/701,018.

10. Post-Hoc Manual Adjustment

The projection system can execute the foregoing process in (near) real-time to project warped visual content from a content source onto a surface in the space as the user selects a surface or object in a video feed or device-domain image rendered on her mobile device. For example, the projection system can execute the foregoing process to project warped visual content from a content source onto a surface in the space within two seconds of selection of this surface at the mobile device. The projection system and/or the native application can then interface with the user to adjust the position of this projected visual content on the corresponding surface or object, such as responsive to voice commands from the user or responsive to gestures or other manual inputs entered by the user at the mobile device.

In one implementation, once the user selects a point, surface, or object in the video feed or device-domain image rendered on the mobile device, the native application can: highlight this point, surface, or object over the video feed or device-domain image; render virtual horizontal-shift, vertical-shift, and rotate controls near this point, surface, or object highlighted in the video feed or device-domain image; and prompt the user to adjust the highlighted point, surface, or object via these virtual controls. When the user selects these virtual controls, the native application can return corresponding commands to the projection system, which can update the position of the flag for this content source in the projector-domain image, calculate a new target azimuthal and altitudinal position for the light projector, recalculate a warp for this content source given this new target azimuthal and altitudinal position, apply this new warp to visual content from this content source, drive the projection assembly to this target azimuthal and altitudinal position, and project warped visual content from this content source into the space according to these commands.

In another implementation, once the projection system casts warped visual content from a content source onto a surface—selected by the user at the mobile device—into the space according to an initial position selected for this content source, the projection system (or the native application) can enable voice controls to shift the position of projected visual content for this content source, such as including: "shift left," "shift right," "shift up," "shift down," "rotate clockwise," and "rotate counterclockwise."

In particular, upon receiving a command to shift projection of visual content in the space, the projection system can implement methods and techniques described above: to calculate a new azimuthal and altitudinal position of the projection assembly that shifts the focal axis of the light projector according to this command; to define a new virtual projection boundary—around the new focal axis of the light projector and thus offset from the original virtual projection boundary calculated for this content source—in the projector-domain image; to extract a new surface profile from inside the second virtual projection boundary in the projector-domain image; and to calculate a new warp (e.g., a new three-dimensional keystone correction) based on the new surface profile. The projection system can then: drive the projection assembly to this new azimuthal and altitudinal position; apply the new warp to visual content output by this content source; and project this visual content—deformed according to the new warp—toward the corresponding surface in the space.

For example, in response to a manual or voice command to shift projection of visual content for a content source horizontally in the space, the projection system can: define a new virtual projection boundary—horizontally-offset from the initial virtual projection boundary for this content source by a fixed angular offset (e.g., 0.5°, 1.0°)—in the projector-domain image according to this command; pan the projector assembly to shift the field of view of the light projector horizontally (e.g., by 0.5°, 1.0°) according to this command; calculate a new warp based on a surface profile extracted from the projector-domain image for this new target azimuthal and altitudinal position; apply this new warp to visual content output by the content source; and project this visual content—deformed according to the new warp—toward the corresponding surface in the space in (near) real-time.

In another implementation, after linking a content source to a surface in the space and projecting visual content from this content source onto this surface, the projection system and/or the native application can enable a cancellation to remove the link between this content source and this surface and then deactivate projection of visual content from this content source onto this surface responsive to receipt of this command.

Additionally or alternatively, the projection system and/or the native application can: enable a replacement command; and then replace a link between this surface and the content source with a link between this surface and a second content source responsive to selection of this replacement command and the second content source (e.g., from a content source menu described above). Accordingly, the projection system can implement methods and techniques described above to: calculate a new target azimuthal and altitudinal position and a new warp for this second content source; apply this new warp to visual content from this second content source; drive the projection assembly to this new target azimuthal and altitudinal position; and project warped visual content from this second content source onto this surface in (near) real-time.

However, the projection system and/or the native application can capture and respond to commands to modify a source-surface link for the space.

11. Content Assignment in Projector-Domain Image Via Mobile Device

In another variation, the projection system executes a setup routine and generates a projector-domain image of the space. The native application then accesses (e.g., downloads) this projector-domain image of the space, such as upon conclusion of the setup routine, and renders this projector-domain image of the space on the mobile device's display, such as in the form of a virtual reality environment. The user may then: virtually navigate through this projector-domain image of the space—decoupled from the physical space itself—on her mobile device; select from available content sources; and then assign select content sources to certain locations within the projector-domain image of the space, as described above. The native application can then return this annotated projector-domain image of the space to the projection system.

Therefore, in this variation, the projection system (and/or the remote computer system) can: execute a setup routine to capture a sequence of scans (e.g., depth images, color images) of the space; compile this sequence of scans into the projector-domain image (e.g., a three-dimensional representation of the space); and transmit this projector-domain image of the space to the mobile device. The native application can then implement methods and techniques described above to receive content source, surface, and/or object selections—over the projector-domain image—from the user and to annotate the projector-domain image accordingly. The native application can then return content source and surface selections—referenced to the projector-domain image—to the projection system. (Alternatively, the native application can return the entire annotated projector-domain image to the projection system.) The projection system can then execute methods and techniques described above to: calculate a target azimuthal and altitudinal position and a warp for this content source and corresponding surface; apply this warp to visual content from this content source; drive the projection assembly to this target azimuthal and altitudinal position; and project warped visual content from this content source onto this surface in (near) real-time.

12. Hybrid Content Assignment: Mobile Device Window

In another variation shown in FIG. 1, the projection system executes a setup routine and generates a projector-domain image of the space georeferenced to the space. The projection system (or the remote computer system, rather than the native application) can then implement methods and techniques described above to detect discrete surfaces (e.g., approximately planar surfaces) and/or objects represented in this projector-domain image and to annotate the projector-domain image with 3D boundaries of these detected surfaces and/or objects.

When the user later elects to link content sources to surfaces and objects in the space, the native application can: access this projector-domain image of the space, such as upon conclusion of the setup routine; and localize the mobile device to the space by aligning features detected in data recorded by sensors in the mobile device to features depicted in the projector-domain image of the space. For example, the native application can implement simultaneous localization and mapping techniques to localize the mobile device to the space based on the projector-domain image of the space generated by the projection system during the setup routine.

With the mobile device thus localized in the space, the native application can: project boundaries of surfaces and object in the projector-domain image of the space onto a video feed output by cameras in the mobile device; and render this augmented video feed on the mobile device's display in order to visually indicate to the user possible locations for projected content in the space. The user may then select a particular surface or object highlighted on the display in order to link a particular content source to this particular surface or object. The native application (or the projection system) can then write an identifier, geometry, size, etc. for visual content received from the particular content source directly to the projector-domain image of the space.

Similarly, the user may select a content source and a point, select a surface, or draw a boundary around an area of interest in a video feed rendered on the user's mobile device. The native application can then project the point, surface, or boundary input by the user onto the projector-domain image of the space, such as by: locating the mobile device in the projector-domain image of the space; and projecting a ray from the selected point, surface, or boundary on the mobile device's display toward a surface depicted in the projector-domain image. The native application can link the selected content source to this surface accordingly.

As the user links content sources to surfaces or objects in the space and as the native application stores these associations in the projector-domain image of the space, the native application can augment subsequent frames in the video feed to depict current or generic content from these content sources in their assigned locations before rendering these augmented frames in (near) real-time on the mobile device's display. The native application can then interface with the user, as described above, to adjust the position and geometry of this content depicted on these surfaces or objects through this virtual environment rendered on the mobile device, such as by dragging or pinching over the projected content depicted in the live video feed rendered on the mobile device. Alternatively, the projection system or the native application can implement voice detection and voice control techniques to adjust the location, scale, or geometry of the projected content based on voice commands received from the user.

Additionally or alternatively, once the user links a particular content source to a particular surface or object in the space, the projection system can access current or generic content from the particular content source and project this content onto its assigned surface in the space substantially in real-time, thereby providing immediate visual feedback in real space to the user. The user may then shift, rotate, skew, or otherwise modify the projected content; and the projection system or the native application can update the projector-domain image of the space and the projection system can update content projected into the space to reflect this change entered by the user.

12.1 Projected Optical Fiducials

In this variation, the projection system can also project optical fiducials at known locations—relative to the projector-domain image—in the space. During this setup period, the native application can then: scan a video feed recorded by the camera in the mobile device for these optical fiducials; and interpret the location and orientation of the mobile device relative to the projector-domain image of the space based on positions and geometries of these optical fiducials detected in the video feed and known positions and geometries of these optical fiducials in the space.

In a similar variation, the projection system can: project optical fiducials in a known pattern throughout the space; record a projector-domain video through the feedback camera; and construct a projector-domain image of the space based on distribution and geometries of these optical fiducials detected in the projector-domain video. Simultaneously, the user may move the mobile device throughout the space as the native application: records a mobile-domain video feed through the integrated camera; and constructs a device-domain image of the space based on distribution and geometries of optical fiducials detected in the mobile-domain video. The native application, projection system, and/or remote computer system can then fuse these project- and device-domain images of the space to construct a more complete and/or higher-resolution representation of the space.

13. Hybrid Content Assignment: Mobile Device as Linking Fiducial

In one variation, the native application populates a list of available content sources and presents this list to the user. In this variation, when the user selects a particular content source from this list, the native application: prompts the user to hold the mobile device—with display facing the projection system—over a surface that the user intends to animate with content from this content source; and render a (substantially-unique) barcode or other optical fiducial associated with this particular content source. Concurrently, the projection system scans the space for an illuminated barcode or other optical fiducial. Upon detecting this barcode or other optical fiducial, the projection system can assign content from the particular content source to a planar surface detected in the space nearest this barcode or other optical fiducial.

In a similar variation, the projection system interfaces with a handheld light projector (e.g., a laser pointer) to identify surfaces and objects of interest to the user. Thus, rather than move the mobile device with rendered optical fiducial throughout the space to indicate visual content location, the user may point the handheld light projector toward a surface in the space. The projection system can then: scan the feedback camera across the space to capture a set of images of the space; detect a projection from the handheld light projector (e.g., a green "dot") in this set of images; track this projection in subsequent images captured by the feedback camera; locate the position of this projection in the projector-domain image of the space; isolate a surface or object—represented in the projector-domain image—coincident or adjacent the position of this projection; and then link the particular content source to this surface or object. The projection system can then implement methods and techniques described above to project warped visual content from this content source onto this surface or object, such as in (near) real-time.

14. Content Assignment by Projection System

Alternatively, the projection system can execute the foregoing methods and techniques locally and can interface with the user directly (e.g., via voice control) or via the native application executed on the user's mobile device to define and confirm source-surface links in the space.

15. Source-Surface and Source-Object Link Recommendations

In one variation, the native application and/or the projection system (or the remote computer system) detects surfaces in the space suitable for augmentation and then recommends augmentation of these surfaces to the user, such as by: highlighting these surfaces in a video feed, device-domain image, or projector-domain image rendered on the mobile device; and/or by projecting a cue or recommendation directly onto these surfaces in the space.

15.1 Surface Characteristics

In this variation, the method S100 can further include: detecting, in the first projector-domain image, a first surface and a second surface within a threshold distance of the projection system, the second surface distinct and offset from the first surface in Block S122; defining a first association between the first surface and a first content source accessible by the projection system in Block S142; and defining a second association between the second surface and a second content source accessible by the projection system in Block S142, as shown in FIGS. 1 and 3.

In one implementation, the projection system (or the remote computer system) scans the projector-domain image for groups of points that represent surfaces approximating vertical planes and falling within a threshold distance (e.g., five meters) of the projection system. Then, in response to detecting a group of points—in the projector-domain image—that fall approximately on (e.g., within two centimeters of) a vertical plane, that span at least a minimum area (e.g., 20 centimeters by 20 centimeters), and that are located within the threshold distance of an origin—corresponding to the projection system—in the projector-domain image, the projection system can flag this surface as a candidate for augmentation.

Then, in response to detecting a surface that fulfills these conditions, the projection system can: define an association between the surface and visual "highlight" content; and project visual "highlight" content into the space accordingly in order to highlight this surface, thereby drawing the user's attention to this surface. For example, the projection system can project an animation of slowly-moving white dots (or "fairy dust")—such as described in U.S. patent application Ser. No. 16/701,018—onto this surface. In another implementation, the projection system can: define a zoom setting and target azimuthal and altitudinal positions that center the surface in the field of view of the light projector; define a rectilinear visual border (e.g., a neon-green, 20-millimeter-wide border) around the perimeter of this surface that falls in the field of view of the light projector; implement methods and techniques described above to calculate a warp for this visual border based on a profile of the surface extracted from the projector-domain image; and then project this visual border—corrected according to this warp—onto this surface, thereby highlighting this surface for the user. The projection system can also project a textual prompt to confirm augmentation of this surface onto or adjacent the surface. Additionally or alternatively, the native application can render a textual prompt to confirm augmentation of this surface, such as on or adjacent the surface depicted in the live video feed rendered on the mobile device. Then, in response to receipt of confirmation to augment this surface, such as via a voice command or manual confirmation entered at the mobile device, the projection system and/or the native application can: prompt the user to select from a set of content sources accessible by the projection system; replace the initial association between this surface and the virtual "highlight" content with a new association between the surface and a particular content source selected by the user from a set of content sources currently active at the projection system or native application. The projection system can then implement methods and techniques described above to: warp visual content output by the particular content source according to the profile of the surface thus extracted from the projector-domain image in Block S154; actuate the projector assembly to locate this surface in the field of view of the light projector in Block S152; and project this warped visual content—via the light projector—toward the first surface in Block S150.

Therefore, in this implementation, the projection system can flag a surface for augmentation based on planarity and orientation of the surface.

The projection system can then repeat this process for other groups of points—representing surfaces that fulfill these conditions—in the projector-domain image. Furthermore, the projection system can prioritize flagged surfaces based on size, brightness, planarity, orientation, and/or other surface characteristics extracted from the projector-domain image (or from the device-domain image). For example, the projection system can score these flagged surfaces: proportional to size; proportional to flatness or planarity; inversely proportional to brightness; and inversely proportional to distance from a target offset from the projection system (e.g., two meters). The projection system can then implement methods and techniques described above to highlight these surfaces in order of their scores.

Additionally or alternatively, as the user manipulates the mobile device within the space, the native application can generate the device-domain image and implement the foregoing methods and techniques to: scan the device-domain image for surfaces that fulfill the foregoing conditions; flag these surfaces; virtually highlight these surfaces in the device-domain image or live video feed rendered on the device; and prompt the user to link these surfaces to available content sources. For example, while the user points her mobile device at different regions of the space during a setup period, the native application can selectively annotate the live video feed with boundaries or highlighted areas around flagged surfaces depicted in this video feed. The user may then select a highlighted surface—such as by tapping over these highlighted surfaces in the video feed—in order open a menu of available content sources to manually link to this surface.

15.2 Object-Based Recommendations

Figure 7:
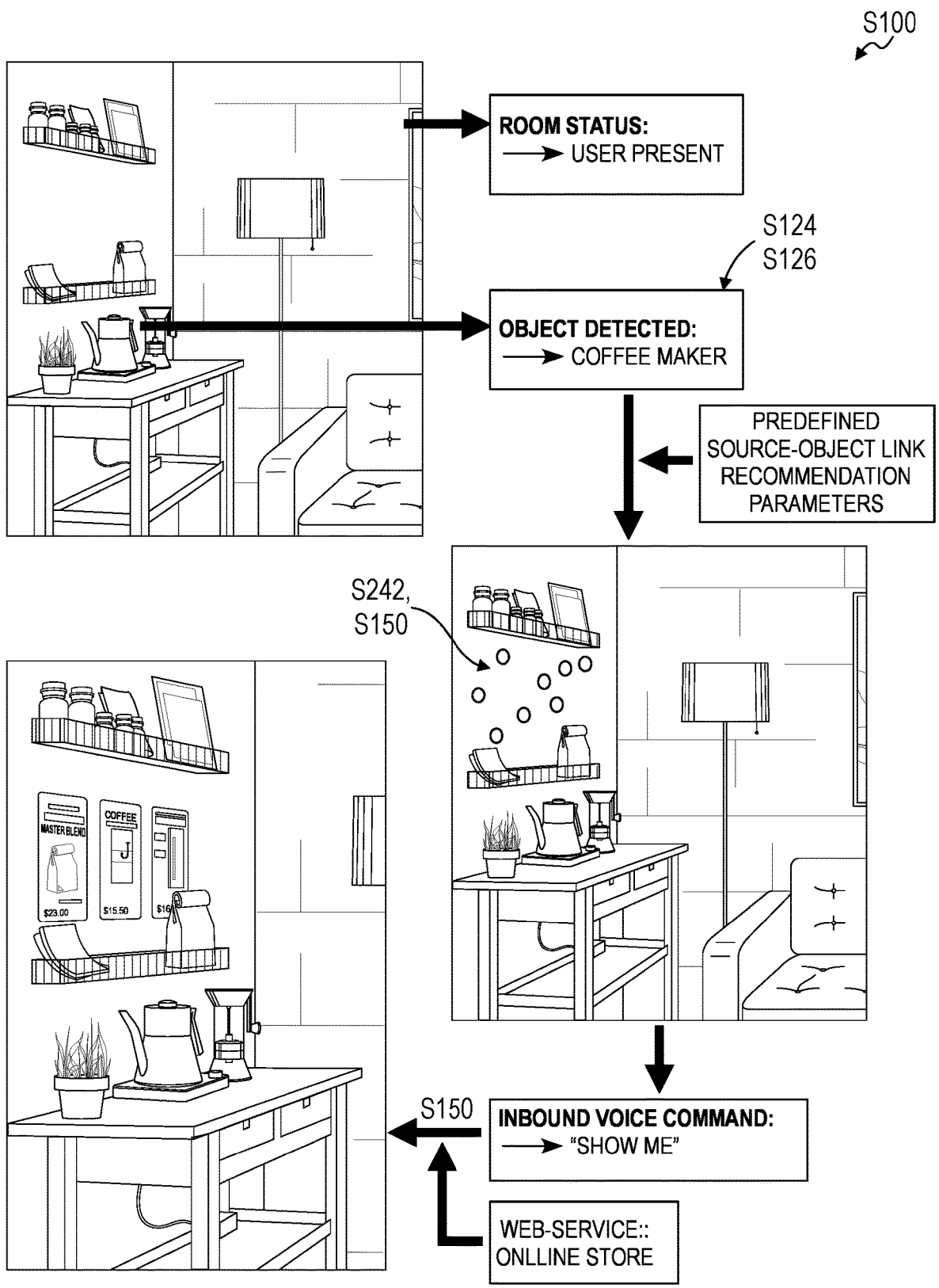
FIG. 7 is a flowchart representation of one variation of the method.
Figure 8:
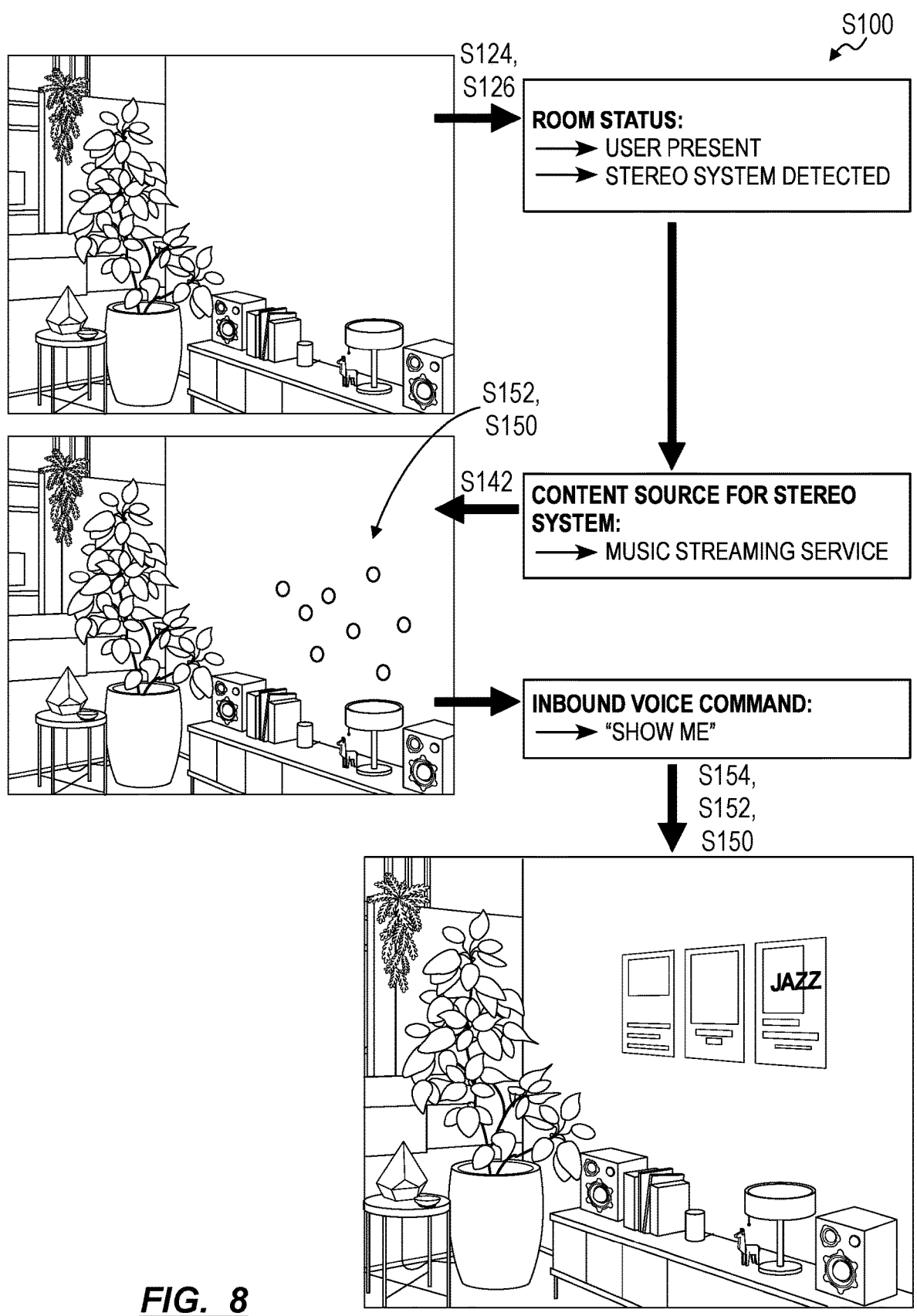
FIG. 8 is a flowchart representation of one variation of the method.

This variation of the method S100 can additionally or alternatively include: detecting a set of objects in the projector-domain image in Block S124; identifying an object—in the set of objects—as of a first type in Block S126; detecting a surface proximal the object in the projector-domain image in Block S140; and defining an association between the surface and a content source based on the first type of the object in Block S142, as shown in FIGS. 3, 7, and 8.

In one implementation, the native application locally detects and characterizes objects and surfaces in a video feed recorded by the mobile device in (near) real-time as the user moves her mobile device throughout the space. For example, the native application can implement deep learning, computer vision, object detection, object recognition, and/or other methods and techniques to detect types of objects (e.g., table, chair, book, wall art, stereo) or specific objects (e.g., map of San Francisco provided by or associated with a rideshare service; coffeemaker; board in a board game) in the space. The native application then generates recommendations for linking available content sources to these surfaces or objects based on the content model, such as by: highlighting these objects and surfaces in real-time in this video feed and annotating these objects—in the video feed—with names or icons of recommended content sources; or by overlaying current or generic content from these content sources over recommended surfaces or objects detected in the video feed. The native application can then prompt the user to confirm or discard these recommendations. If the user confirms a recommendation for linking a particular content source to a particular surface, the native application can then interface with the user as described above to refine the position and orientation of content—from the particular content source—projected into the space and store this link accordingly.

For example, as the user manipulates her mobile device throughout the space, the native application (or the remote computer system) can implement artificial intelligence or computer vision techniques (e.g., object detection and recognition) to detect an object in the device-domain image and to identify a type of this object. The native application can then: retrieve an association between the object and a particular content source, such as from preloaded object-based content source assignments; and highlight the object—with a recommendation for the particular content source—in the live video feed or device-domain image rendered on the display of the mobile device. The native application, the projection system, and/or the remote computer system can then: receive confirmation of this recommendation for the particular content source from the user; project the position of the object from the device-domain image into the projector-domain image; isolate a surface depicted proximal the position of the object in the projector-domain image; and write a link between this surface and the particular content source in the projector-domain image responsive to confirmation from the user.

In another implementation, after the projection system completes the first setup routine and generates the projector-domain image of the space, the projection system can upload the projector-domain image of the space to the remote computer system. The remote computer system can then: remotely process the projector-domain image of the space to detect and identify objects and surfaces in the space; link these objects and surfaces to content sources confirmed by the user; and label the projector-domain image of the space accordingly. The remote computer system can additionally or alternatively link these objects and surfaces to recommended content sources even if not yet enabled by the user, as described above.

The projection system can then automatically (and in near real-time) retrieve current or generic visual content from recommended content sources and project this content onto corresponding surfaces or objects in the space, such as by moving the projector assembly to sequentially illuminate these surfaces or objects with content from recommended content sources on eight-second intervals. Concurrently, the native application can render a list of these recommended content sources, and the user may confirm or discard recommendations on this list as the projection system cycles through these projections. Alternatively, the user may confirm or discard these recommendations through voice controls.

In a similar implementation, the projection system (or the native application, the remote computer system) can: receive selection of a surface from the user, as described above; scan the projector-domain image coincident (or near) this selection for a discrete object; implement computer vision techniques (e.g., object recognition) to identify a type of this object (e.g., wall art, a console, a chair, a table, a rug, a shelf, a television); query object-based content source assignments for a particular content source associated with the type of this object; and automatically initialize a link between this surface or object and the particular content source accordingly. The projection system can then execute processes described above to automatically project warped visual content from this particular content source onto this object and prompt the user to confirm this source-object link. Therefore, in this implementation, the projection system (or the native application, the remote computer system) can define an association between a surface of an object and a content source based on a type of the object.

15.3 Contextual Recommendations

In a similar implementation, the projection system and/or the native application can recommend links between surfaces and content sources based on types of objects detected and content sources enabled in the space.

In one example, in response to detecting a stereo system in the space and if access to a music streaming service is enabled at the projection system or at the native application, the projection system or the native application can recommend a link between the music streaming service and a wall surface above the stereo system, such as by: rendering an icon for the music streaming service on the wall in the video feed rendered on the mobile device or by projecting this icon directly onto this wall in the space; and then prompting the user to confirm or cancel this link, such as via a manual input at the mobile device or with a voice command.

In another example, in response to detecting wall art in the space and if an art augmentation service is enabled at the projection system or native application, the projection system or the native application can recommend a link between the wall art with content and the art augmentation service, such as by: rendering an animation over this wall art in the video feed rendered on the mobile device or by projecting an animation directly onto this wall art in the space; and then prompting the user to confirm or cancel this link as described above.

In yet another example, in response to detecting a television in the space and if an online shopping and fulfillment service is enabled at the projection system or native application, the projection system or the native application can recommend a link between a wall area to the left (or right) of the television and the online shopping and fulfillment service. Similarly, in response to detecting a television in the space and if a video service is enabled at the projection system or native application, the projection system or the native application can similarly recommend a link between the wall area to the left (or right) of the television and secondary content from the video service. (In this example, once this link is confirmed by the user and when video from the video service is played on the television, the projection system can project secondary content associated with this video adjacent the television, such as actor profiles or subtitles.)

In another example, in response to detecting a coffee maker in the space and if an online shopping and fulfillment service is enabled at the projection system or native application, the projection system or the native application can recommend a link between a wall area over the coffee maker and a virtual shelf of coffee and coffee-related products from the online shopping and fulfillment service.

15.4 Content Source Activation Recommendations

Similarly, the native application and/or the projection system can recommend activation of additional content sources based on objects and surfaces detected in the space.

In one example, in response to detecting a coffee table in the space, the projection system or the native application can recommend that the user enable a board game application at the projection system. In another example, in response to detecting wall art in the space but if no art augmentation application is currently enabled at the projection system or native application, the projection system or the native application can recommend an art augmentation application to the user, such as by: rendering a virtual textual recommendation to download this art augmentation application adjacent this wall art depicted in the live video feed at the user's mobile device; or projecting this recommendation onto or adjacent this wall art in the space. In yet another example, in response to detecting a map in the space, the projection system or the native application can recommend that the user enable access to a rideshare service. In another example, in response to detecting a stereo system in the space, the projection system or the native application can recommend that the user enable access to a music streaming service. In the foregoing examples, once the user elects to download a recommended application or provides login credentials for a recommended application at the projection system or native application, the projection system (or the native application) can automatically link this recommended application to the recommended surface or object in the space.

In a similar implementation, the projection system and/or the native application can prompt the user to activate a set of content sources based on a detected or predicted type of the space. For example, the native application (or the projection system, the remote computer system) can implement computer vision techniques to identify and predict types of a set of objects in the space and then implement artificial intelligence techniques to predict a type of the space based on types of these objects, such as: a kitchen in response to identifying a console, a table, and chairs surrounding the table; a living room in response to identifying a table and sofa adjacent the table; and a bedroom in response to identifying a bed and a console. Then, in response to identifying the space as a kitchen, the native application can: aggregate a list of content sources including a cooking recipe application, a coffee maker monitoring widget, a rideshare service, and a calendar widget; and prompt the user to link these content sources to surfaces in the space. Similarly, in response to identifying the space as a living room, the native application can: aggregate a list of content sources including a rideshare service, a television augmentation widget, an art animation widget, a music streaming service, and a tabletop gaming service; and prompt the user to link these content sources to surfaces in the space.

15.5 Source-Surface Link Probability

In one variation, the native application, the projection system, and/or the remote computer system calculate probabilities that certain content sources will be confirmed for certain surfaces or objects in the space and selectively serve recommendations for such source-surface and source-object recommendations to the user accordingly. For example, the remote computer system can calculate a probability of association between a particular content source and a particular surface in the space based on: the remote computer system's confidence in the determined type of the surface (e.g., a wall, wall art, or door); a frequency that the user opens the related native application on her mobile device; frequencies that other users have confirmed associations between this content source (or a similar content source) and similar surfaces in the past; and/or proximity of the surface to the projection system. The projection system can then sequentially project content from content sources onto recommended surfaces or objects in order of calculated probability of confirmation by the user. Thus, as the projection system renders content from a first content source on a first surface with greatest probability of confirmation, the native application can render a prompt to confirm, discard, or modify this first association. Once the user responds to this first recommendation, the projection system can render content from a second content source on a second surface with second-greatest probability of confirmation; and the native application can render a prompt to confirm, discard, or modify this second association. The projection system and the native application can repeat this process for remaining recommendations or until the native application is closed by the user.

In a similar implementation, as the user manipulates her mobile device in the space, the native application can localize the mobile device to the projector-domain image of the space based on features detected in a video feed recorded by the forward-facing camera in the mobile device. Based on the location of the mobile device in the space, the projection system (or the native application) can isolate a particular region of the space that currently falls in the field of view of the forward-facing camera and that can therefore be rendered on the mobile device's display. Accordingly, the projection system (or the native application) can: track the projector assembly along particular regions of the space that currently fall in the field of view of the mobile device; identify surfaces or objects in this particular region of the space that are also associated with recommended content sources; and selectively project current or generic content from these content sources onto their recommended surfaces. The projection system can therefore selectively project content from content sources onto recommended surfaces based on the position of the mobile device in the space, thereby enabling the user to control the projection system by moving the mobile device throughout the space, such as similar to a magnifying glass or viewfinder.

15. Pre-Loaded Content Sources

In one variation, the projection system: is preloaded with a set of universal (or "generic") content sources, such as a clock widget, a setup widget with textual and graphical descriptions, and/or an art animation widget; and automatically executes the foregoing methods and techniques to identify surfaces in the space that are candidates for augmentation and selectively projects visual content from these content sources onto these surfaces accordingly, such as within seconds or minutes of the user first placing the projection system in the space and without necessitating further input from the user.

In one implementation, the projection system: executes a setup routine when first placed in the space; generates a projector-domain image of the space based on data collected during this setup routine; isolates a set of large, vertical and horizontal surfaces near a target distance from the projection system in this projector-domain image; automatically defines a first association between a first surface in this set and a first content source (e.g., the setup widget) preloaded onto the projection system; and automatically defines a second association between a second surface in this set and a second content source (e.g., the clock widget) preloaded onto the projection system. The projection system then executes the foregoing processes: to extract surface profiles of the first and second surfaces from the projector-domain image; to generate a first warp and a second warp for the first and second content sources, respectively; and then selectively project warped visual content from the first and second content sources onto the first and second surfaces, respectively. For example, the projection system can: drive the projection assembly to locate the first surface in the field of view of the light projector; and then project warped visual content from the first content source onto the first surface for a first thirty seconds after completing the setup routine. The projection system can then: drive the projection assembly to locate the second surface in the field of view of the light projector; and then project warped visual content from the second content source onto the second surface for a next thirty seconds before returning to projecting warped visual content from the first content source onto the first surface.

Concurrently, the user may manipulate her mobile device throughout the space and interface with the native application, as described above, to select and link other surfaces in the space to other content sources. As the native application confirms links between these other surfaces and other content sources, the native application can return these source-surface links, and the projection system can automatically transition between projecting warped visual content from the first content source, the second content source, and these other content sources onto their corresponding surfaces in the space. In this implementation, the native application and/or the projection system can also interface with the user to modify or replace associations between the first and second surfaces and the first and second content sources, respectively, such as described above.

16. Physical Product Suggestion

In one variation, the native application (or the projection system, the remote computer system) can also recommended to the user physical products to add to the space which can then be linked to available content sources. For example, if a rideshare service is enabled at the mobile device, the native application can recommend a physical map poster of the user's city or a geographic region in which the user frequently enters rideshare requests; once the user hangs this map poster on a wall in the space, the projection system can detect the map poster and selectively cast routes and ride statuses from the rideshare service onto the map poster. In another example, if a gaming application is enabled on the mobile device and a table is detected in the space, the native application can recommend to the user a physical game board and physical game pieces for this game; when the user later places the game board on the table, the projection system can detect the game board and selectively cast game-related visual content from the gaming application onto the game board.

17. Automatic Adjustment

In another variation, the projection system automatically executes or recommends changes to source-surface links assigned to the space based on additional data collected by the projection system over time.

In one implementation, the projection system: executes a second setup routine at a later time (e.g., when no human is present in the space) to generate a second, updated projector-domain image (e.g., a high-resolution projector-domain image); compares the second projector-domain image to the earlier projector-domain image to identify changes in the space; and then selectively (de)activates source-surface links and/or recommends new source-surface links based on presence of a new object (or absence of a familiar object) in the space. For example, in response to detecting that an object—previously linked to a particular content source—is no longer present in the space, the projection system can deactivate or mute a source-surface link for this object. Similarly, in response to detecting that an object—previously linked to a particular content source—has moved from a previous position, the projection system can: recalculate target azimuthal and altitudinal positions that center this object or corresponding surface—for the current position of the object—in the field of view of the projection system; and recalculate a warp for this content source based on the new position of the object, such as described above.

In another example, in response to detecting a new object in the space, the projection system can implement methods and techniques described above to: identify the object; retrieve a predefined relationship between this object type and a particular content source; identify a target surface on or near the new object in the second projector-domain image; and calculate a warp for visual content output by this particular content source based on a profile of the target surface represented in the second projector-domain image. Later, when the projection system detects a human in the space (e.g., via the context camera), the projection system can: drive the projection assembly to locate the target surface in the field of view of the light projector; project warped visual content from this particular content source onto the target surface; and directly prompt the human to confirm this source-surface link or transmit a notification to the user's mobile device to confirm this source-surface link.

Alternatively, rather than project warped visual content from this particular content source onto the target surface, the projection system can instead project an animation of slowly-moving white dots (or "fairy dust," as described above) onto the target surface when the projection system detects motion or presence of a human in the space, as shown in FIGS. 3, 7, and 8. Upon seeing this animation, the user may speak, "show me" or "what's that?" Upon receiving this voice command or vocal response from the user, the projection system can transition from projecting "fairy dust" onto the target surface to projecting visual content from the particular content source onto the target surface. Then, while projecting visual content from the particular content source onto the target surface, the projection system can: confirm this source-surface link responsive to vocal affirmation from the user (e.g., "cool," or "keep it"); or discard this source-surface link responsive to vocal denial from the user (e.g., "kill it," or "don't show me that again"). Additionally or alternatively, the projection system can interface with the user via the native application to trigger transition from projecting "fairy dust" to projecting visual content from the particular content source onto the target surface and to selectively confirm or cancel this source-surface link, such as described above.

In another implementation, the projection system (or the native application, the remote computer system) can implement similar methods and techniques to selectively augment a surface in the space in response to publication of a new content source and/or in response to new access to a new content source at the projection system or native application. Accordingly, the projection system can notify the user that this new content source is available by automatically selecting a candidate surface in the space and projecting warped visual content from this content source (or "fairy dust") onto this candidate surface, such as while motion or a human is detected in the space.

However, the projection system, the native application, and/or the remote computer system can implement any other method or technique to automatically execute changes to source-surface links in the space and/or to interface with the user to confirm such changes over time.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for augmenting surfaces in a space with visual content comprising:
   at a projection system located in the space, recording a first sequence of scans of the space;
   compiling the first sequence of scans into a first projector-domain image of the space;
   identifying a set of content sources configured to output visual content accessible by the projection system to augment surfaces in the space;
   receiving a first selection from a first device-domain image of the space rendered on a display of a mobile device;
   transferring the first selection into the first projector-domain image to identify a first surface in the space;
   linking the first surface to a first content source in the set of content sources;
   actuating a projector assembly in the projection system to locate the first surface in the field of view of a light projector in the projection system;
   warping a first visual content received from the first content source according to a first profile of the first surface extracted from the first projector-domain image; and projecting the first visual content, via the light projector, toward the first surface.

2. The method of claim 1:
wherein compiling the first sequence of scans into the first projector-domain image comprises compiling the first sequence of scans into a three-dimensional representation of the space;
further comprising transmitting the three-dimensional representation of the space to the mobile device;
wherein receiving the first selection comprises receiving the first selection spatially-referenced to the three-dimensional representation of the space rendered on the display of the mobile device;
further comprising defining a first target on the first surface based on a location of the first selection in the three-dimensional representation of the space; and
wherein actuating the projector assembly to locate the first surface in the field of view of the light projector comprises driving the projector assembly to locate the first target, on the first surface, proximal a center of the field of view of the light projector.

3. The method of claim 1:
wherein receiving the first selection comprises:
  receiving the first selection at a first position over a video feed captured by the mobile device as a user manipulates the mobile device within the space;
  compiling frames in the video feed into the first device-domain image of the space; and
  locating the first position of the first selection over the video feed in the first device-domain image;
wherein transferring the first selection into the first projector-domain image to identify the first surface in the space comprises:
  spatially aligning the first device-domain image to the first projector-domain image; and
  transferring the first position of the first selection from the first device-domain image into the first projector-domain image; and
wherein warping the first visual content according to the first profile of the first surface comprises:
  extracting a three-dimensional profile, around the first position of the first selection transferred into the first projector-domain image, relative to the projection system;
  calculating a first warp that represents a converse of the three-dimensional profile of the first surface; and
  deforming the first visual content according to the warp.

4. The method of claim 1:
wherein receiving the first selection comprises, at a first time, accessing the first device-domain image captured by the mobile device while occupying the space and annotated with a flag at a position of the first selection entered by a user viewing the first device-domain image at the mobile device;
wherein recording the first sequence of scans of the space comprises recording the first sequence of scans of the space at a second time succeeding the first time;
wherein transferring the first selection into the first projector-domain image comprises:
  aligning the three-dimensional representation of the space to the first projector-domain image; and
  transferring the flag in the three-dimensional representation of the space to the first projector-domain image;
wherein linking the first surface to the first content source comprises linking the first content source to the flag in the first projector-domain image.

5. The method of claim 1:
further comprising linking a second surface, distinct and offset from the first surface, in the space to a second content source in the set of content sources;
wherein actuating the projector assembly to locate the first surface in the field of view of the light projector and projecting the first visual content toward the first surface comprise actuating the projector assembly to locate the first surface in the field of view of the light projector and projecting the first visual content toward the first surface at a first time in response to receiving the first selection; and
further comprising, at a second time offset from the first time:
  actuating the projector assembly to locate the second surface in the field of view of the light projector;
  warping a second visual content received from the second content source according to a second profile of the second surface extracted from the second projector-domain image; and
  projecting the second visual content toward the second surface.

6. The method of claim 5, wherein linking the second surface in the space to the second content source in the set of content sources comprises:
  detecting an optical fiducial in the first projector-domain image;
  retrieving an association between the optical fiducial and the second content source;
  serving a prompt to a user to confirm the association; and
  linking the second surface, proximal the optical fiducial, to the second content source according to the association in response to receiving confirmation from the user.

7. The method of claim 1:
wherein recording the first sequence of scans of the space comprises recording the first sequence of low-resolution scans of the space over a first period of time;
wherein compiling the first sequence of scans into the first projector-domain image comprises compiling the first sequence of low-resolution scans into the first projector-domain image defining a low-resolution representation of the space;
wherein warping the first visual content received from the first content source according to the first profile of the first surface comprises:
  extracting a low-resolution three-dimensional profile of the first surface from the first projector-domain image; and
  calculating a first low-resolution warp that represents a converse of the low-resolution three-dimensional profile of the first surface; and
further comprising:
  over a second period of time greater than and succeeding the first period of time, recording a second sequence of high-resolution scans of the space;
  compiling the second sequence of high-resolution scans into a second projector-domain image defining a high-resolution representation of the space;
  extracting a high-resolution three-dimensional profile of the first surface from the second projector-domain image; and calculating a second high-resolution warp that represents a converse of the high-resolution three-dimensional profile of the first surface; and wherein projecting the first visual content toward the first surface comprises:
  projecting the first visual content, deformed according to the first warp, toward the first surface during a third period of time between the first period of time and the second period of time; and
  projecting the first visual content, deformed according to the second warp, toward the first surface during a fourth period of time succeeding the second time.

8. The method of claim 7:
wherein recording the first sequence of low-resolution scans of the space at the first time comprises recording the first sequence of low-resolution scans of the space at the first time while a human is detected in the space; and
wherein recording the second sequence of high-resolution scans of the space at the second time comprises recording the second sequence of high-resolution scans of the space at the second time in response to the projection system detecting absence of a human in the space.

9. The method of claim 1:
wherein recording the first sequence of scans of the space comprises, during a setup period:
  driving the projector assembly through a setup path to sweep the field of view of the light projector across the space;
  sequentially projecting, via the light projector, a sequence of setup frames toward surfaces in the space; and
  sequentially capturing the first sequence of scans via an optical sensor adjacent and offset from the light projector and defining a second field of view intersecting the field of view of the light projector; and
wherein compiling the first sequence of scans into the first projector-domain image comprises:
  fusing the sequence of setup frames and the first sequence of scans into a first set of depth images based on a stored offset between the light projector and the optical sensor; and
  merging the set of depth images into the first projector-domain image comprising a three-dimensional map of the space.

10. The method of claim 1:
further comprising:
  detecting a first object in the first device-domain image;
  identifying a first type of the first object;
  retrieving a first association between the first type of the first object and the first content source; and
  highlighting the first object, with a first recommendation for the first content source, in the first device-domain image rendered on the display of the mobile device; and
wherein receiving the first selection from the first device-domain image comprises receiving the first selection of the first recommendation for the first content source at the first object depicted in the first device-domain image;
wherein transferring the first selection into the first projector-domain image to identify the first surface in the space comprises, in response to receiving the first selection of the first recommendation:
  projecting a position of the first object from the first device-domain image into the first projector-domain image; and
  identifying the first surface depicted proximal the position of the first object in the first projector-domain image; and
wherein linking the first surface to the first content source comprises linking the first surface to the first content source according to the first association in response to receiving the first selection of the first recommendation.

11. The method of claim 1:
further comprising:
  detecting a first set of surfaces in the first projector-domain image of the space, each surface in the first set of surfaces approximating a vertical plane within a threshold distance of the projection system;
  highlighting the first set of surfaces in the first device-domain image; and
  serving a prompt to a user, through the mobile device, to select a content source from the set of content sources; and
wherein receiving the first selection from the first device-domain image comprises receiving the first selection of the first surface from the set of surfaces highlighted in the first device-domain image; and
wherein linking the first surface to the first content source comprises linking the first surface to the first content source in response to selection of the first content source, from the set of content sources, at the mobile device.

12. The method of claim 1:
wherein warping the first visual content received from the first content source comprises:
  defining a first virtual projection boundary on a representation of the first surface in the first projector-domain image;
  extracting the first profile of the first surface from inside the first virtual projection boundary in the first projector-domain image;
  calculating a first three-dimensional keystone correction based on the first profile of the first surface relative to the projection system; and
wherein projecting the first visual content toward the first surface comprises projecting the first visual content, deformed according to the first three-dimensional keystone correction, toward the first surface at a first time; and
further comprising:
  at a second time succeeding the first time, receiving a command to shift projection of the first visual content in the space;
  defining a second virtual projection boundary, offset from the first virtual projection boundary in the first projector-domain image, according to the command;
  extracting a second profile from inside the second virtual projection boundary in the first projector-domain image;
  calculating a second three-dimensional keystone correction based on the second profile relative to the projection system; and
  projecting the first visual content, deformed according to the second three-dimensional keystone correction, toward the first surface following the second time.

13. The method of claim 12:
wherein transferring the first selection into the first projector-domain image to identify the first surface in the space comprises transferring the first selection into the first projector-domain image to identify the first surface spatially proximal the first selection and representing a contiguous area approximating a vertical plane and unobstructed in the field of view of the light projector; and wherein defining the first virtual projection boundary on the representation of the first surface in the first projector-domain image comprises defining the first virtual projection boundary around an approximate center of the first surface represented in the first projector-domain image.

14. The method of claim 12:

wherein receiving the command to shift projection of the first visual content comprises receiving a voice command to shift projection of the first visual content horizontally in the space;

wherein defining the second virtual projection boundary in the first projector-domain image comprises defining the second virtual projection boundary, horizontally-offset from the first virtual projection boundary, in the first projector-domain image according to the voice command; and further comprising, following the second time, panning the projector assembly in the projection system to shift the field of view of the light projector horizontally according to the voice command.

15. A method for augmenting surfaces in a space with visual content comprising:

at a projection system located in the space, recording a first sequence of scans of the space;

aggregating the first sequence of scans into a first projector-domain image of the space;

detecting, in the first projector-domain image, a first surface and a second surface within a threshold distance of the projection system, the second surface distinct and offset from the first surface;

defining a first association between the first surface and a first content source accessible by the projection system;

defining a second association between the second surface and a second content source accessible by the projection system;

during a first period of time:
　based on the first association, warping a first visual content output by the first content source according to a first profile of the first surface extracted from the first projector-domain image;
　actuating a projector assembly in the projection system to locate the first surface in the field of view of a light projector in the projection system; and
　projecting the first visual content, via the light projector, toward the first surface; and during a second period of time succeeding the first period of time:
　based on the second association, warping a second visual content output by the second content source according to a second profile of the second surface extracted from the first projector-domain image;
　actuating the projector assembly to locate the second surface in the field of view of the light projector; and
　projecting the second visual content, via the light projector, toward the second surface.

16. The method of claim 15:

wherein defining the first association comprises defining the first association between the first surface and the first content source preloaded onto the projection system;

wherein defining the second association comprises defining the second association between the second surface and the second content source preloaded onto the projection system;

further comprising:
　at a mobile device:
　　capturing a video feed over a third period of time as a user manipulates the mobile device within the space;
　　during the third period of time, rendering the video feed on a display of the mobile device; and
　　receiving selection of a third surface depicted in the video feed rendered on the display of the mobile device; and
　identifying the third surface in the first projector-domain image;
　defining a third association between a third content source, enabled by the user, and the third surface; and
　during third period of time:
　　based on the third association, warping a third visual content output by the third content source according to a third profile of the third surface extracted from the first projector-domain image;
　　actuating the projector assembly to locate the third surface in the field of view of the light projector; and
　　projecting the third visual content, via the light projector, toward the third surface.

17. The method of claim 15:

wherein warping the first visual content output by the first content source comprises:
　defining a first virtual projection boundary on a representation of the first surface in the first projector-domain image;
　extracting the first profile of the first surface from inside the first virtual projection boundary in the first projector-domain image; and
　calculating a first three-dimensional keystone correction based on the first profile of the first surface relative to the projection system; and wherein projecting the first visual content toward the first surface comprises projecting the first visual content, deformed according to the first three-dimensional keystone correction, toward the first surface at a first time; and further comprising:
　receiving a command to shift projection of the first visual content in the space;
　defining a second virtual projection boundary, offset from the first virtual projection boundary according to the command, in the first projector-domain image;
　extracting an adjusted profile from inside the second virtual projection boundary in the first projector-domain image;
　calculating a second three-dimensional keystone correction based on the adjusted profile relative to the projection system; and
　projecting the first visual content, deformed according to the second three-dimensional keystone correction, toward the first surface following the second time.

18. The method of claim 15, further comprising:

during projection of the first visual content, via the light projector, toward the first surface, prompting a user to confirm augmentation of the first surface;

in response to receipt of confirmation from the user, prompting the user to select from a set of content sources accessible by the projection system;

replacing the first association with a third association between the first surface and a third content source selected from the set of content sources by the user; and during third period of time succeeding the first period of time:

based on the third association, warping a third visual content output by the third content source according to the first profile of the first surface extracted from the first projector-domain image;

actuating the projector assembly to locate the first surface in the field of view of the light projector; and projecting the third visual content, via the light projector, toward the first surface.

19. The method of claim 15:

further comprising identifying a first type of a first object coincident the first surface;

wherein defining the first association between the first surface and the first content source comprises defining the first association between the first surface and the first content source based on the first type of the first object;

wherein detecting the second surface comprises, based on the first projector-domain image, detecting the second surface approximating a vertical plane within the threshold distance of the projection system; and wherein defining the second association between the second surface and the second content source comprises defining the second association between the second surface and the second content source based on planarity and orientation of the second surface.

20. A method for augmenting surfaces in a space with visual content comprising:

at a projection system located in the space, recording a first sequence of scans of the space;

aggregating the first sequence of scans into a first projector-domain image of the space;

detecting a first set of objects in the first projector-domain image;

identifying a first object, in the set of objects, as of a first type;

detecting a first surface proximal the first object in the first projector-domain image;

defining a first association between the first surface and a first content source based on the first type of the first object;

based on the first association, warping a first visual content output by the first content source according to a first profile of the first surface extracted from the first projector-domain image;

actuating a projector assembly in the projection system to locate the first surface in the field of view of a light projector in the projection system; and projecting the first visual content, via the light projector, toward the first surface.

* * * * *